US012381421B2

(12) United States Patent
Fujii

(10) Patent No.: US 12,381,421 B2
(45) Date of Patent: Aug. 5, 2025

(54) ANTENNA DEVICE, FEED DEVICE, AND FEED METHOD

(71) Applicant: MINEBEA MITSUMI Inc., Nagano (JP)

(72) Inventor: Masaaki Fujii, Nagano (JP)

(73) Assignee: MINEBEA MITSUMI Inc., Nagano (JP)

( * ) Notice: Subject to any disclaimer, the term of this patent is extended or adjusted under 35 U.S.C. 154(b) by 0 days.

(21) Appl. No.: 18/570,377

(22) PCT Filed: Mar. 28, 2022

(86) PCT No.: PCT/JP2022/014902
§ 371 (c)(1),
(2) Date: Dec. 14, 2023

(87) PCT Pub. No.: WO2023/276369
PCT Pub. Date: Jan. 5, 2023

(65) Prior Publication Data
US 2024/0283296 A1    Aug. 22, 2024

(30) Foreign Application Priority Data

Jul. 1, 2021  (JP) .................................. 2021-110324

(51) Int. Cl.
*G06T 3/047* (2024.01)
*G06T 7/50* (2017.01)
(Continued)

(52) U.S. Cl.
CPC .............. *H02J 50/20* (2016.02); *G06T 3/047* (2024.01); *G06T 7/50* (2017.01); *G06T 7/66* (2017.01);
(Continued)

(58) Field of Classification Search
CPC .......... H02J 50/20; H02J 50/402; H02J 50/90; H02J 50/23; G06T 3/047; G06T 7/50;
(Continued)

(56) References Cited

U.S. PATENT DOCUMENTS

2014/0253029 A1    9/2014  Uchida et al.
2015/0045091 A1    2/2015  Nakatani
(Continued)

FOREIGN PATENT DOCUMENTS

JP    H01-120906    5/1989
JP    H06-085534    3/1994
(Continued)

OTHER PUBLICATIONS

International Search Report of Int. Appl. No. PCT/JP2022/014902 dated May 17, 2022.
International Search Report for PCT/JP2022/014516 mailed on May 24, 2022.
(Continued)

*Primary Examiner* — Daniel Cavallari
(74) *Attorney, Agent, or Firm* — IPUSA, PLLC

(57) ABSTRACT

An antenna device includes circuitry to acquire, based on a second position, an elevation angle of a projected position that is obtained by projecting a first position onto a second plane including a first axis and a third axis, the elevation angle being relative to the third axis of the second plane. The circuitry controls a phase adjuster such that a direction of a beam defines the elevation angle for the second plane, based on phase data that is retrieved according to acquired elevation angle, and performs power ramping on at least one given transmission power signal.

15 Claims, 12 Drawing Sheets

(51) Int. Cl.
*G06T 7/66* (2017.01)
*G06T 7/73* (2017.01)
*H01Q 3/26* (2006.01)
*H01Q 21/06* (2006.01)
*H02J 50/20* (2016.01)
*H02J 50/40* (2016.01)

(52) U.S. Cl.
CPC ............. *G06T 7/74* (2017.01); *H01Q 3/2652* (2013.01); *H01Q 21/061* (2013.01); *H02J 50/402* (2020.01); *G06T 2207/30204* (2013.01)

(58) Field of Classification Search
CPC ... G06T 7/66; G06T 7/74; G06T 2207/30204; H01Q 3/2652; H01Q 21/061; H01Q 3/2605
See application file for complete search history.

(56) References Cited

U.S. PATENT DOCUMENTS

| | | |
|---|---|---|
| 2018/0226839 A1 | 8/2018 | Higaki et al. |
| 2022/0021112 A1 | 1/2022 | Fujii |

FOREIGN PATENT DOCUMENTS

| | | | | |
|---|---|---|---|---|
| JP | 2012-129709 | 7/2012 | | |
| JP | 2014-120816 | 6/2014 | | |
| JP | 2014-193056 | 10/2014 | | |
| JP | 2018-125815 | 8/2018 | | |
| JP | 2019-135900 | 8/2019 | | |
| JP | 2020-136918 | 8/2020 | | |
| KR | 20190133807 A | * | 12/2019 | ............... H01Q 3/26 |
| WO | 2013/080285 | 6/2012 | | |

OTHER PUBLICATIONS

Office Action mailed on May 14, 2025 with respect to related U.S. Appl. No. 18/570,371.

* cited by examiner

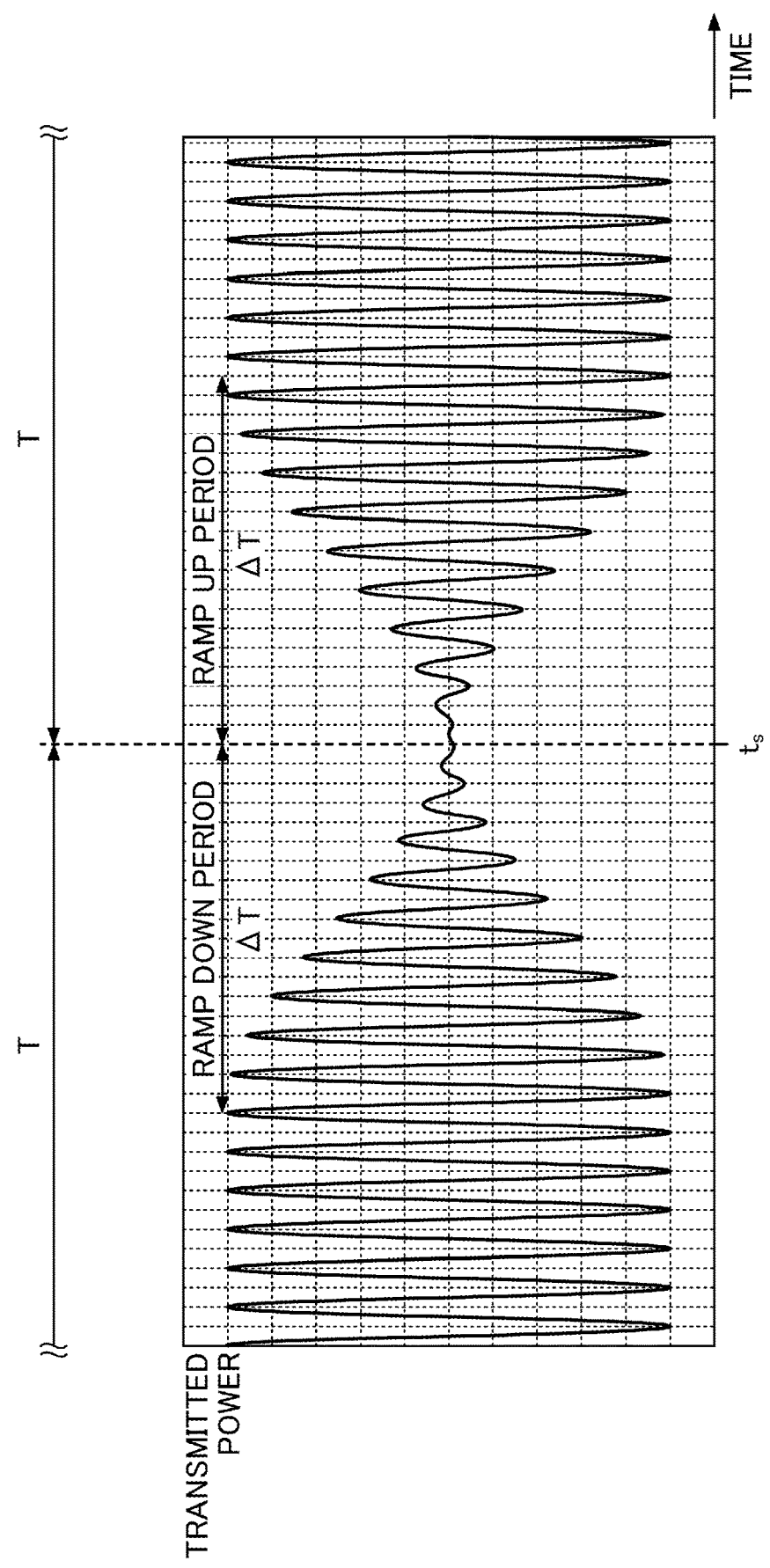

ANTENNA DEVICE, FEED DEVICE, AND FEED METHOD

TECHNICAL FIELD

The present invention relates to an antenna device, a feed device, and a feed method.

BACKGROUND

There has been a wireless power transmitter, and the wireless power transmitter includes a beam transmitter that transmits a feed energy beam to a wireless power receiver that is mounted on an airplane, an information acquiring unit that acquires control information for increasing power reception efficiency of the wireless power receiver, and a controller that controls the energy beam based on the control information so as to increase the power reception efficiency of the wireless power receiver. As a power transmitting antenna, the use of an array antenna is described (see Patent Document 1, for example).

CITATION LIST

Patent Document

Patent Document 1: Japanese Unexamined Patent Application Publication No. 2019-135900

SUMMARY

Problem to be Solved by the Invention

When power is transmitted by the multiple antennas in the array antenna, and then the wireless power receiver receives the power that is transmitted from multiple antenna elements of the array antenna, in a case where the wireless power receiver is mounted on an airplane as in the conventional wireless power transmitter, there is a sufficient distance between the wireless power transmitter (feed device) and the wireless power receiver (power receiver). With this arrangement, a distance difference between the multiple antenna elements and the power receiver is provided to the extent to which the distance difference is negligible. In this case, even when the power is transmitted by the multiple antenna elements to the same target, a smaller phase shift occurs when the power receiver receives the power, and thus a problem is unlikely to occur.

However, when the distance between the power receiver and the feed device is a short distance of about several meters, in a case where the power is transmitted from the multiple antenna elements to the same target, a difference between power transmission distances that are obtained in a case where the power receiver receives the power is large, and thus an increased phase shift occurring when the power receiver receives the power is increased. Therefore, there may be a problem in that a combination of received power is reduced.

Here, when phases of transmission power signals that are transmitted from the multiple antenna elements are adjusted to match phases for power reception, in a case where the phases change while maintaining the transmitted power, a discontinuity in a phase change may be created. Thus, an undesirable signal such as a high frequency component is generated, and as a result, it may be difficult to transmit the power stably.

Therefore, an object is to provide an antenna device, a feed device, and a feed method that are capable of transmitting power stably, when adjusting phases of transmission power signals transmitted by multiple antenna elements to match phases for power reception.

Means to Solve the Problem

An antenna device according to an embodiment of the present invention includes an array antenna including multiple antenna elements that are bidimensionally arranged along a first axis and a second axis; a phase adjuster configured to adjust phases of transmission power signals that are respectively supplied by the multiple antenna elements, with respect to a first axis direction; an image acquiring unit configured to acquire an image through a fisheye lens; a position deriving unit configured to convert a first position of a marker that is included in the image acquired by the image acquiring unit, into a second position of polar coordinates on a first plane that includes the first axis and the second axis, the first position being used in the image acquiring unit; an elevation-angle acquiring unit configured to acquire, based on the second position, an elevation angle of a projected position that is obtained by projecting the first position onto a second plane including the first axis and a third axis, the elevation angle being relative to the third axis of the second plane; a storage that stores multiple sets of phase data for respective elevation angles, the phase data indicating phases in which the transmission power signals are transmitted by the respective antenna elements to a power receiver that is situated at a position of the marker, the phases being adjusted such that the adjusted phases of the transmission power signals that are received by the antenna elements are matched; a controller configured to retrieve, from the storage, the phase data in association with the elevation angle acquired by the elevation-angle acquiring unit, and control the phase adjuster such that a direction of a beam, emitted by the array antenna based on the retrieved phase data, defines the elevation angle for the second plane; and a power ramping unit configured to perform power ramping on at least one given transmission power signal among the transmission power signals, in a case where the phase adjuster adjusts the phases of the transmission power signals.

Effects of the Invention

An antenna device, a feed device, and a feed method that are capable of transmitting power stably, when adjusting phases of transmission power signals that are transmitted by multiple antenna elements, in order to match phases for power reception can be provided.

BRIEF DESCRIPTION OF DRAWINGS

FIG. 12 is a diagram illustrating an example of the temporal change in transmitted power of a transmission power signal in the case where power ramping is performed.

DESCRIPTION OF EMBODIMENTS

Embodiments to which an antenna device, a feed device, and a feed method of the present invention are applied are described below.

Embodiments

Figure 1:
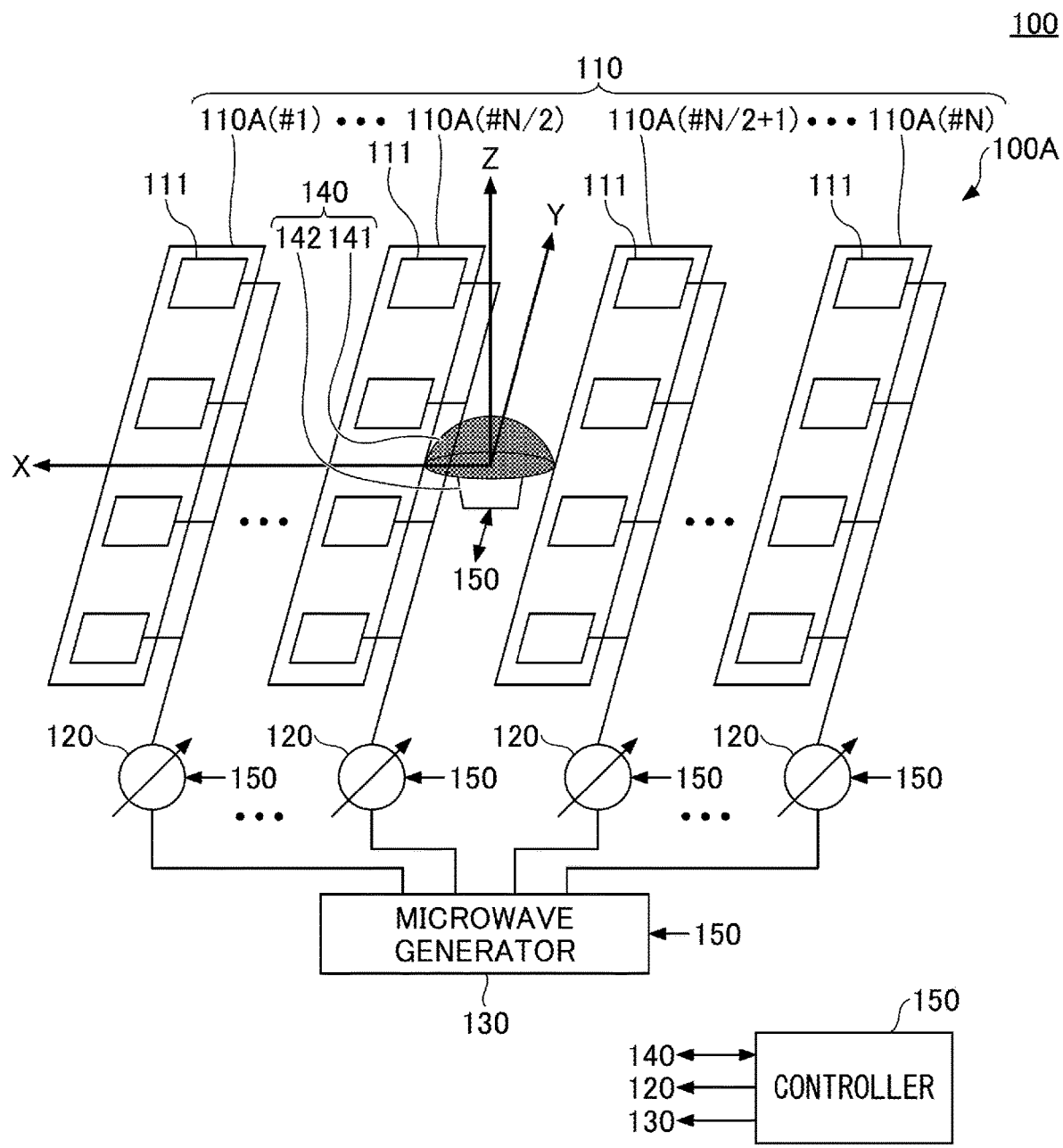
FIG. 1 is a diagram illustrating a feed device 100 according to an embodiment.

FIG. 1 is a diagram illustrating a feed device 100 according to the embodiment. The feed device 100 includes an array antenna 110, phase shifters 120, a microwave generator 130, a camera 140, and a controller 150. An antenna device 100A according to the embodiment is obtained by removing the microwave generator 130 from the feed device 100. FIG. 1 illustrates a simplified configuration of a proximal portion of each phase shifter 120. The configuration of the proximal portion of the phase shifter 120 will be described below in detail with reference to FIG. 9.

In the following description, an XYZ coordinate system is used. A plan view refers to an XY plan view. An X-axis is an example of a first axis, a Y-axis is an example of a second axis, and a Z-axis is an example of a third axis. The XY plane is an example of a first plane, and an XZ plane is an example of a second plane.

For example, the array antenna 110 is divided into N subarrays 110A. The first (#1) to the N-th (#N) subarrays 110A in the N subarrays are illustrated. Here, N is an integer greater than or equal to 2, and in FIG. 1, a manner in which N is an even number greater than or equal to 4 is illustrated. The N subarrays 110A are arranged in an X-axis direction (first axis direction), and each subarray 110A includes four antenna elements 111, for example. In this arrangement, the array antenna 110 includes 4N antenna elements 111, for example. Each array antenna 110 extends in a Y-axis direction (second axis direction). The antenna elements 111 are patch antennas each of which has a rectangular shape in a plan view. The array antenna 110 may include a ground plate that is held at a ground potential and is on a negative Z-axis side of the antenna elements 111. In an example, a center of a position of the 4N antenna elements 111 coincides with the origin of the XYZ coordinate system. In addition, it is sufficient when the number of antenna elements 111 included in each subarray 110A is two or more, and it is sufficient when these antenna elements are bidimensionally arranged.

Figure 2:
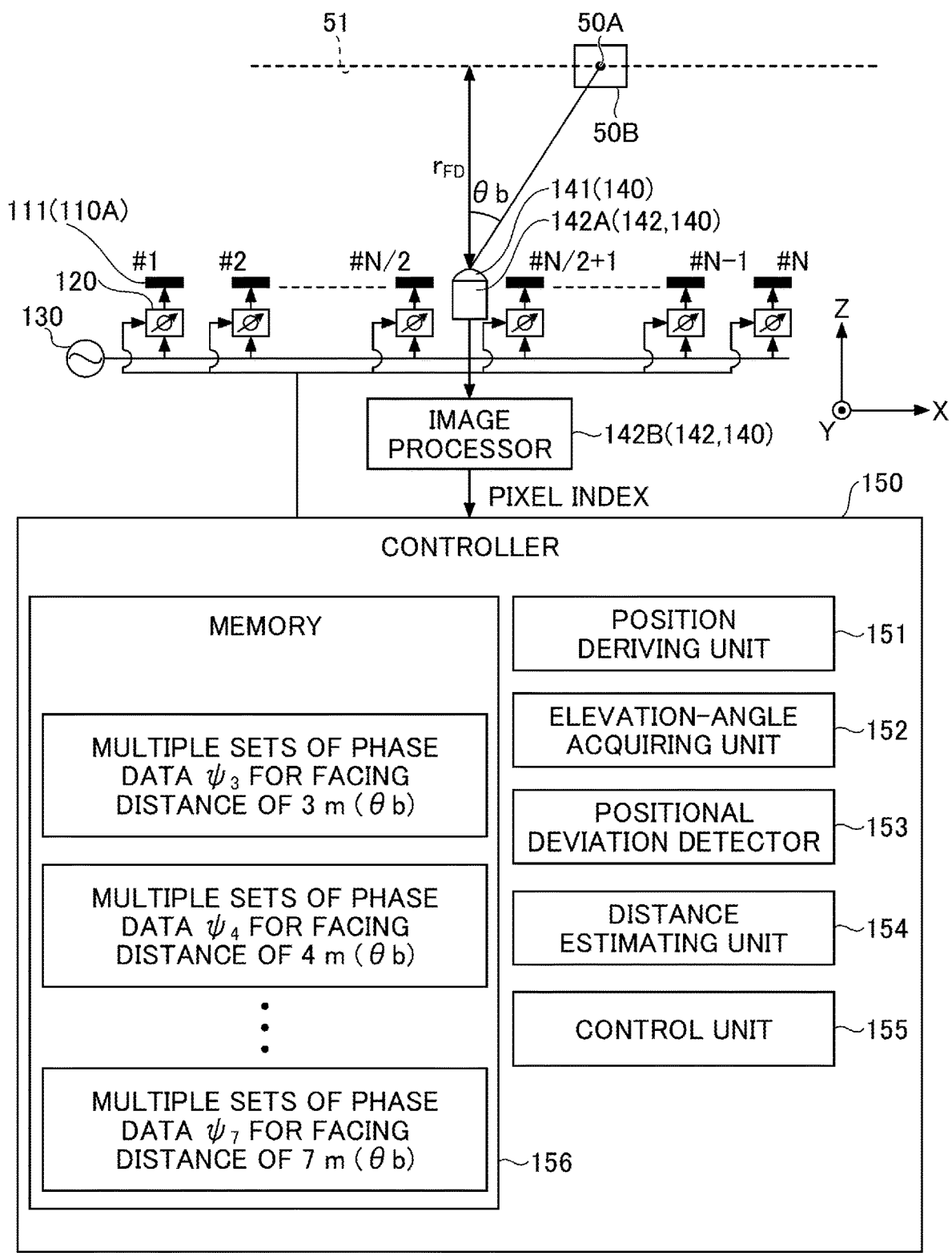
FIG. 2 is a diagram illustrating the feed device 100 according to the embodiment.

The description will be provided below with reference to FIG. 2 in addition to FIG. 1. FIG. 2 is a diagram illustrating the feed device 100 according to the embodiment. FIG. 2 illustrates a simplified configuration of the proximal portion of each phase shifter 120, as in FIG. 1. Although the origin of the XYZ coordinate system is shifted in FIG. 2 for purposes of facilitating the visualization of the figure, the description will be provided below on the assumption that the origin of the XYZ coordinate system coincides with the center of the position of the 4N antenna elements 111 as illustrated in FIG. 1. FIG. 2 illustrates antenna elements 111 in the respective subarrays 110A that are disposed in a negative Y-axis direction with respect to the X-axis. FIG. 2 also illustrates components included in the controller 150, a marker 50A, and a power receiver 50B. The marker 50A and the power receiver 50B are fixed to an inner wall 51 of a tunnel, for example. The inner wall 51 of the tunnel is an example of a wall, and an interior of the tunnel is an example of a space at which the marker 50A disposed along the inner wall 51 exists. In an example, the antenna device 100A and the feed device 100, which are mounted on a working vehicle, travel in the tunnel, while detecting the marker 50A that is attached to the inner wall 51 of the tunnel, and then the antenna device 100A and the feed device 100 transmit power to the power receiver 50B.

In FIG. 2, the marker 50A is present toward a direction that is defined using an angle θb relative to the Z-axis in a XZ plan view. In FIG. 2, the XYZ coordinate system is shifted for convenience of description. However, the origin of the XYZ coordinate system coincides with the center of the position of the 4N antenna elements 111, and thus the angle θb is an angle between a straight line that connects the origin of the XYZ coordinate system and the marker 50A on the XZ plane, and the Z-axis. When the XZ plane is viewed from the positive Y-axis direction, the angle θb indicates a positive value in a case where the angle θb points toward a positive X-axis direction. In contrast, the angle θb indicates a negative value in a case where the angle θb points toward a negative X-axis direction.

N phase shifters 120 are respectively provided to correspond to the N subarrays 110A, and the N phase shifters 120 are coupled to antenna elements 111 of the N subarrays 110A. The phase shifter 120 is an example of a phase adjustor that adjusts a phase, and is an example of the phase shifter. In each subarray 110A, four antenna elements 111 are coupled in parallel to one phase shifter 120.

In each subarray 110A, transmission power signals in the same phase are respectively supplied to the four antenna elements 111. Phases of the transmission power signals that the N phase shifters 120 output to the N subarrays 110A, respectively, are different from one another. In this arrangement, an angle (elevation angle) of a beam that is formed by radio waves emitted by the 4N antenna elements 111 can be controlled in the XZ plane.

The beam formed by the radio waves emitted by the 4N antenna elements 111 is synonymous with the beam output from the array antenna 110. The beam output from the array antenna 110 is synonymous with the beam output from each of the antenna device 100A and the feed device 100.

The microwave generator 130 is coupled to the N phase shifters 120, and supplies a microwave of predetermined power. The microwave generator 130 is an example of a radio wave generator. A frequency of the microwave is, for example, a frequency in a 920 MHz band. A manner in which the feed device 100 includes the microwave generator 130 is described in this description, but the microwave is not limiting. It is sufficient when a radio wave at a predetermined frequency is used.

The camera 140 is arranged between an (N/2)-th subarray 110A and an (N/2+1)-th subarray 110A in the X-axis direction. The camera 140 is arranged between a second antenna element 111 and a third antenna element 111 in the positive Y-axis direction, among the four antenna elements 111 that are included for each subarray in the Y-axis direction. The camera 140 includes a fisheye lens 141 and a camera body 142. The camera 140 is an example of an image acquiring unit. In FIG. 2, the camera body 142 is illustrated for a capturing unit 142A and an image processor 142B separately.

The fisheye lens 141 is a lens that employs equidistant projection. In an example, a central position of the fisheye lens 141 coincides with each of a center of the 4N antenna elements 111 and the origin of the XYZ coordinate system. The camera body 142 is a portion of the camera 140 other than the fisheye lens 141. The camera body 142 may include a camera with a complementary metal oxide semiconductor (CMOS) image sensor, or may include an infrared camera.

The camera 140 acquires an image including the marker 50A through the fisheye lens 141, and outputs image data to the controller 150. The marker 50A is attached to the power receiver 50B with a power receiving antenna that is a target to be irradiated with the beam output from the antenna device 100A and the feed device 100. The antenna device 100A and the feed device 100 determine a position of the marker 50A included in the image that is acquired by the camera 140, and emits the beam toward the power receiver 50B.

The camera body 142 includes the capturing unit 142A and the image processor 142B. The capturing unit 142A includes an imaging element, and is a portion that acquires the image data by capturing the image through the fisheye lens 141. The image processor 142B performs image processing, such as binarization, on the image acquired by the capturing unit 142A, and outputs a pixel index to the controller 150. The pixel index is an XY-coordinate value (address) indicating the position of the marker 50A on an imaging screen.

The controller 150 includes a position deriving unit 151, an elevation-angle acquiring unit 152, a positional deviation detector 153, a distance estimating unit 154, a control unit 155, and a memory 156. The controller 150 is implemented by a computer that includes a CPU (central processing unit) and a memory. Functions of the position deriving unit 151, the elevation-angle acquiring unit 152, the positional deviation detector 153, the distance estimating unit 154, and the control unit 155, implemented by a program that the controller 150 executes, are expressed by respective functional blocks. The memory 156 functionally expresses a memory in the controller 150.

Figure 3:
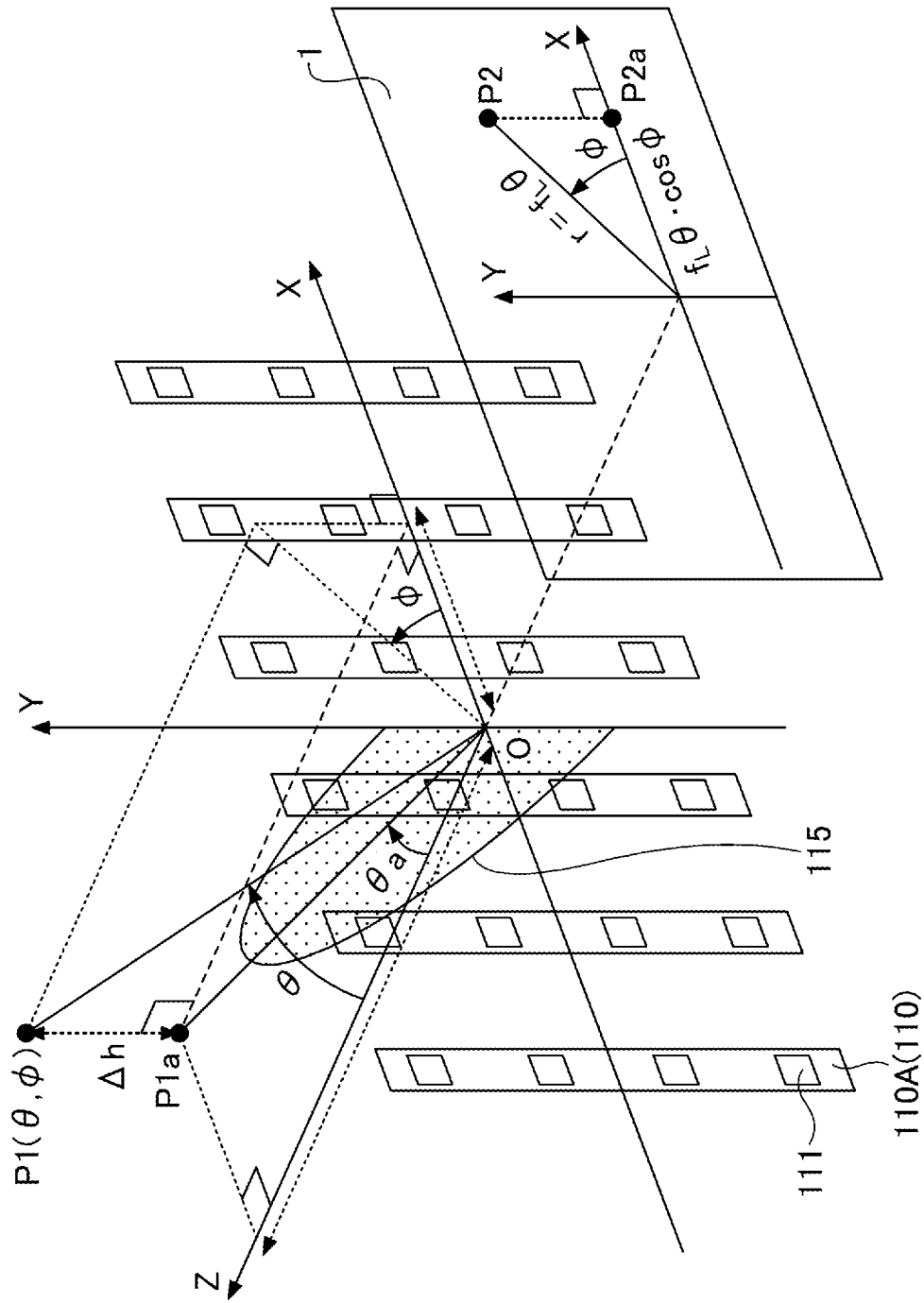
FIG. 3 is a diagram illustrating a polar coordinate system of an array antenna 110.

The position deriving unit 151, the elevation-angle acquiring unit 152, the positional deviation detector 153, the distance estimating unit 154, the control unit 155, and the memory 156 are described below with reference to FIG. 3 in addition to FIGS. 1 and 2. FIG. 3 is a diagram illustrating a polar coordinate system of the array antenna 110. In FIG. 3, the subarrays 110A of the array antenna 110 in the feed device 100, the antenna elements 111 included in the subarrays 110A, and a beam 115 that is output from the array antenna 110 are illustrated, and components other than the above components are omitted. In FIG. 3, the polar coordinate system on a plane 1 that is parallel to the XY plane is illustrated.

The position of the marker 50A in the XYZ coordinate system is expressed as P1. An elevation angle and an azimuth angle that are derived from a line segment that connects the origin O and the position P1 are expressed as $\theta$ and $\varphi$, respectively. The elevation angle is an angle relative to the positive Z-axis direction, and the azimuth angle is an angle relative to the positive X-axis direction. A clockwise direction that is obtained in a plan view viewed from the positive Z-axis direction is expressed using a positive value. The elevation angle derived from a line segment connecting a position P1$a$, obtained by projecting the position P1 onto the XZ plane, and the origin O is expressed as $\theta a$. The elevation angle $\theta a$ is an angle that is approximately obtained by projecting the elevation angle $\theta$ onto the XZ plane, when the position of the marker 50A is close to the XZ plane. As in an angle $\theta b$, when the XZ plane is viewed from the positive Y-axis direction, the elevation angle $\theta a$ indicates a positive value in a case where the elevation angle $\theta a$ points toward the positive X-axis direction. Also, the elevation angle $\theta a$ indicates a negative value in a case where the elevation angle $\theta a$ points toward the negative X-axis direction.

The position P1 is an example of a first position, and the position P1$a$ is an example of a projected position. The origin O is an example of a reference point of the XYZ coordinate system.

The antenna device 100A and the feed device 100 control the elevation angle of the beam 115 output from the array antenna 110, by using only the XZ plane. This assumes that the array antenna 110 performs in-phase feeding with respect to the Y-axis direction so that the beam is fixed in the Y-axis direction, that the resulting beam can be emitted toward an elevation direction in which 0 degrees are set with respect to the Z-axis, and that the position of the power receiver 50B is not so deviated from the XZ plane (for example, the elevation angle relative to the Z-axis of the YZ plane is approximately in the range of ±30 degrees). This is because in a case where the power receiver 50B is situated at the position described above, only by controlling the elevation angle of the beam 115 in the XZ plane, the beam 115 can be efficiently emitted toward the power receiver 50B, and the size of a given control unit in the array antenna 110 is reduced.

The position deriving unit 151 calculates a center of gravity of the image of the marker, based on the pixel index output from the image processor 142B. The pixel index output from the image processor 142B expresses an image obtained by equidistant projection that is performed through the fisheye lens 141. In such image processing, the position P1 that is of the marker included in the image acquired by the camera 140, and that is used in the array antenna 110 is converted into a position P2 that is defined by polar coordinates of the XY plane. In this arrangement, the position deriving unit 151 derives the position P2. The position P1 is a position of the center of gravity, calculated by the position deriving unit 151. The position P2 is an example of a second position.

The position P2 is expressed by a radius vector r from the origin O and a deflection angle $\varphi$. When a focal length of the fisheye lens 141 is expressed as $f_L$, the radius vector r is expressed by $r=f_L\theta$. The deflection angle $\varphi$ is the same as the azimuth angle $\varphi$. By the image processing described above, the position deriving unit 151 determines $r\cdot\cos\varphi$ that is obtained by mapping the radius vector r onto the X-axis. The position deriving unit 151 outputs data indicating the position P2 to the elevation-angle acquiring unit 152.

The elevation-angle acquiring unit 152 acquires (calculates), as the elevation angle $\theta a$, a value ($r\cdot\cos\varphi/f_L$) that is obtained by dividing an X-coordinate ($r\cdot\cos\varphi$) of a mapped position P2 that is obtained by mapping a position P2$a$ onto the X-axis, by the focal distance $f_L$ of the fisheye lens 141. The reason why the elevation angle $\theta a$ can be acquired in this manner will be described below. The elevation-angle acquiring unit 152 outputs the elevation angle θa to the distance estimating unit 154 and the control unit 155.

The positional deviation detector 153 determines a shape, and a center of gravity, of the marker 50A, based on the pixel index output from the image processor 142B, and detects a positional deviation between the camera 140 and the marker 50A in the Y-axis direction, based on the position of the center of gravity of the marker 50A that is present in a region. The position of the center of the fisheye lens 141 coincides with each of the center of the 4N antenna elements 111 and the origin of the XYZ coordinate system, for example. In this arrangement, it is sufficient when a position of the center of the gravity in the Y-axis direction, obtained in a case where there is no positional deviation between the camera 140 and the marker 50A is given as Y=0, for example. If a position of the determined center of the gravity of the marker 50A in the region in the Y-axis direction is given as Y=0, the positional deviation detector 153 determines that there is no positional deviation between the camera 140 and the marker 50A. Also, if the position of the determined center of the gravity of the marker 50A that is present in the region in the Y-axis direction is not given as Y=0, the positional deviation detector 153 determines that there is a positional deviation between the camera 140 and the marker 50A, and thus detects that the positional deviation occurs. The positional deviation detector 153 outputs a result of the detection to the distance estimating unit 154. The position of the center of the gravity may be acquired by the position deriving unit 151.

When the elevation angle θa calculated by the elevation-angle acquiring unit 152 is zero degrees (0 degrees), the distance estimating unit 154 estimates a distance from the center of the fisheye lens 141 to the marker 50A, based on the number of pixel indexes output from the image processor 142B in the camera 140. The elevation angle θa of 0 degrees means that the marker 50A exists in front of the fisheye lens 141 in the Z-axis direction (the center of the gravity of the marker 50A exists on the Z-axis).

The distance estimating unit 154 estimates a facing distance $r_{FD}$ that is from the center of the fisheye lens 141 to the marker 50A, in a case where the elevation angle θa is 0 degrees. The facing distance rap is a distance that is obtained in a case where the marker 50A faces the camera 140 on the Z-axis.

For example, for each of different distances by which the camera 140 and the marker 50A are separated on the Z-axis, the number of binarized pixel indexes that are acquired by the image processor 142B is stored in the memory 156 in advance. Further, in a case where the elevation angle θa is zero degrees (0 degrees), the distance estimating unit 154 counts the number of pixel indexes output from the image processor 142B of the camera 140, and then the distance estimating unit 154 compares a counted value with multiple reference values that correspond to respective facing distances $r_{FD}$ stored in the memory 156, to thereby estimate the facing distance $r_{FD}$ from the center of the fisheye lens 141 to the marker 50A, in the case where the elevation angle θa is 0 degrees. The number of pixel indexes varies depending on the facing distance $r_{FD}$, and thus the facing distance $r_{FD}$ can be estimated based on the number of pixel indexes.

When the elevation angle θa is 0 degrees (0 degrees), in a case where the pixel index is output from the image processor 142B of the camera 140 a plurality of times, the facing distance $r_{FD}$ is sufficiently estimated based on an average of the numbers of pixel indexes.

In addition, when the positional deviation between the camera 140 and the marker 50A occurs in a case where the fisheye lens 141 is used, the number of pixel indexes is reduced in comparison to a case where the positional deviation between the camera 140 and the marker 50A does not occur, even when the same facing distance $r_{FD}$ is obtained. In this arrangement, under a condition in which the positional deviation detector 153 determines that there is a positional deviation between the camera 140 and the marker 50A in the Y-axis direction, it is sufficient when the distance estimating unit 154 estimates the facing distance $r_{FD}$ by using the number of pixel indexes that are obtained by making a correction in accordance with the extent to which the positional deviation occurs in the Y-axis direction, where the distance estimating unit 154 preset stores, in the memory 156, data indicating the extent to which the number of pixel indexes varies.

The control unit 155 controls an amount of phase shift that is caused by each phase shifter 120, such that the direction of the beam 115, emitted by the array antenna 110, defines the elevation angle θa in the XZ plane. The elevation angle θa is acquired by the elevation-angle acquiring unit 152. In addition, the control unit 155 controls the output of the microwave generator 130, and controls the capturing or the like to be performed through the camera 140.

The control unit 155 controls the amount of phase shift that is caused by each phase shifter 120, as described below specifically. The control unit 155 retrieves, from the memory 156, phase data that is in association with the facing distance $r_{FD}$ estimated by the distance estimating unit 154, and the elevation angle θa acquired by the elevation-angle acquiring unit 152. Then, the control unit 155 controls amounts of the phase shift for the N phase shifters 120, based on the retrieved phase data.

Here, in order for the antenna of the power receiver 50B to efficiently receive the power, it is ideal that phases of the transmission power signals, obtained when the power from the N subarrays 110A is received by the antenna of the power receiver 50A, are identical. The antenna device 100A and the feed device 100 transmit the power of the transmission power signals to the power receiver 50B that is located, for example, at a short distance from 3 m to about 7 m. When the power is transmitted to the power receiver 50B that is attached to an inner wall 51 in a tunnel, a distance from the array antenna 110 to the power receiver 50B is, for example, about 3 m to about 5 m, under a condition in which the angle θb is 0 degrees.

The power is assumed to be transmitted at such a short distance, and thus a relative difference between distances that are from the respective N subarrays 110A to the antenna of the power receiver 50B is relatively large. In this case, when the N subarrays 110A transmit the power to the same target, phases of the transmission power signals that are received by the antenna of the power receiver 50B from the N subarrays 110A are not matched, and thus the power receiver 50B cannot efficiently receive the power. The difference between distances that are each from a corresponding subarray, among the N subarrays 110A, to the antenna of the power receiver 50B varies depending on the angle θb and the distance from the corresponding subarray to the antenna of the power receiver 50B, in the Z-axis direction.

In view of the situation describe above, each of the antenna device 100A and the feed device 100 uses phase data used to adjust phases that are obtained when the N subarrays 110A transmit the power, so as to match the phases of the transmission power signals that are from the N subarrays 110A and then are received by the antenna of the power receiver 50B. The phase data indicates a shift amount (adjustment amount). In an example, assuming that power is transmitted in a case where elevation angle θa is changed from +70 degrees to −70 degrees in accordance with the movement of the antenna device 100A and the feed device 100, multiple sets of phase data are prepared to adjust amounts of phase shift that are performed through the N subarrays 110A, and each amount of phase shift is set in increments of 1 degrees. Each phase data includes shift amounts for the N phases to be set by the N phase shifters 120 that are respectively coupled to the N subarrays 110A, in a case where a given elevation angle θa is set. The sets of phase data, namely 141 sets of phase data, are prepared for a given facing distance $r_{FD}$, and the phase data is set in increments of 1 degree within the range of angles θb of +70 degrees to −70 degrees. In order to adjust the shift amounts for the phases for the N subarrays 110A in accordance with each of the facing distances $r_{FD}$, the sets of phase data are prepared for the respective facing distances $r_{FD}$. The phase data is data that is created based on the angle θb, and thus the sets of phase data from $\psi_3$ (θb) to $\psi_7$ (θb) are illustrated using θb in FIG. 2. It is sufficient when the control unit 155 uses the multiple sets of phase data that are obtained in a case where the angle θb is equal to the elevation angle θa. Each of phase data from $\psi_3$ (θb) to $\psi_7$ (θb) includes shift amounts θs #1~θs #N, corresponding to the coordinates (#1 to #N) of the N subarrays 110A. For example, a shift amount θs #1 among the shift amounts θs #1 to θs #N that are included in the phase data $\psi_3$ (θb) is used for the antenna elements 111 of the subarray 110A that is at coordinates #1, and a shift amount θs #N is used for the antenna elements 111 of the subarray 110A that is at coordinates #N. In the following description, the shift amounts θs #1 to θs #N are referred to as shift amounts θs, when they are not distinguished from one another.

The control unit 155 controls amounts of phase shift for the N phase shifters 120, by using phase data for the angle θb that is equal to the elevation angle θa that is acquired by the elevation-angle acquiring unit 152, and the phase data is obtained by using multiple sets of phase data that are in association with facing distances $r_{FD}$ estimated by the distance estimating unit 154.

The memory 156 is an example of a storage. The memory 156 stores a program to be executed when the position deriving unit 151, the elevation-angle acquiring unit 152, and the control unit 155 perform processing. The memory 156 stores data to be used when the program is executed, data to be generated when the program is executed, and image data or the like that is acquired by the camera 140. The memory 156 also stores multiple sets of phase data for respective facing distances $r_{FD}$. In an example, for each of five facing distances $r_{FD}$ of 3 m, 4 m, . . . and 7 m, 141 sets of phase data are stored in one-degree increments for a range of angles θb from +70 degrees to −70 degrees.

Hereinafter, a method for determining the elevation angle θa is described.

When the azimuth angle φ and the elevation angle θ are used, the elevation angle θa can be determined by Equation (1) below, in view of a geometric relationship between the position P1 and the position P1a.

[Math. 1]
$$\theta a = \frac{\pi}{2} - \tan^{-1}\left\{\frac{1}{\cos\phi}\tan\left(\frac{\pi}{2} - \theta\right)\right\} \quad (1)$$

When Equation (1) is expanded, Equation (2) is obtained.

[Math. 2]
$$\tan\theta a = \cos\phi\tan\theta \quad (2)$$

Here, when the elevation angle θ is sufficiently small, tan θ≈θ is given. When the azimuth angle φ is close to 90 degrees, cos φ≈1 is given. When the azimuth angle φ is close to 90 degrees, cos φ≈0 is given. In this case, Equation (2) can be transformed into Equation (3) below.

[Math. 3]
$$\theta a = \theta\cos\phi \quad (3)$$

In other words, when the position of the power receiver 50B is not significantly deviated from the XZ plane, the elevation angle θa can be approximated as expressed by Equation (3).

As described above, when the focal length of the fisheye lens 141 is expressed as $f_L$, the radius vector r is expressed by Equation (4) below.

[Math. 4]
$$r = f_L\theta \quad (4)$$

From Equations (3) and (4), the elevation angle θa can be expressed by Equation (5) below.

[Math. 5]
$$\theta a = r*\cos\phi/f_L \quad (5)$$

With this approach, the elevation angle θa can be approximately determined using Equation (5).

Figure 4:
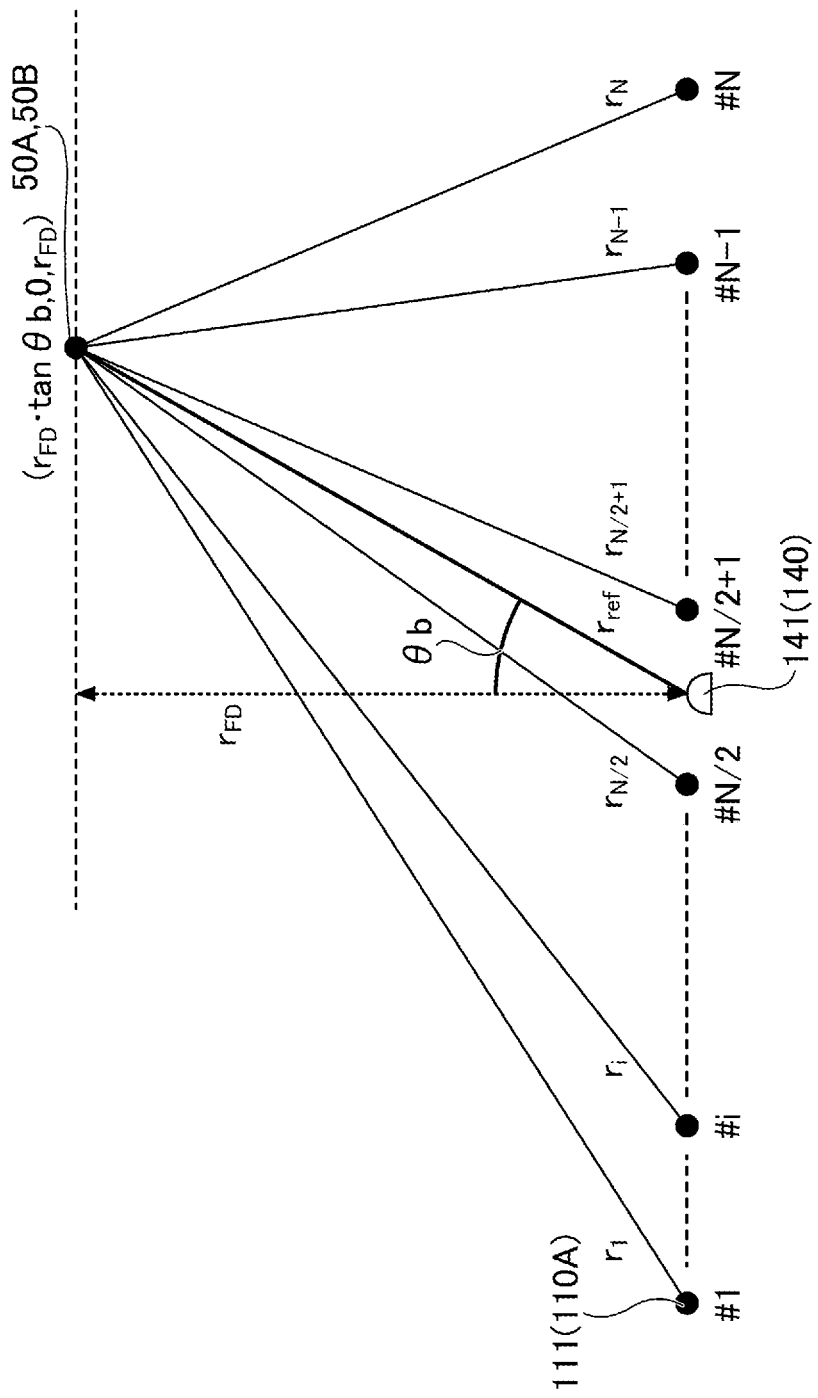
FIG. 4 is a diagram for describing an approach to determine phase data.

Hereinafter, the method for determining the phase data will be described. FIG. 4 is a diagram for describing an approach to determine the phase data. FIG. 4 illustrates the fisheye lens 141 of the camera 140, the marker 50A, the power receiver 50B, and the N antenna elements 111. Each antenna element 111 is a given antenna element of four antenna elements 111 that are included in each of the N subarrays 110A. The position of the marker 50A is the same as the position of the power receiver 50B.

As illustrated in FIG. 4, distances from N subarrays 110A to the marker 50A are respectively given as r1 to rN. Here, in order to simplify the description, it is assumed that there is no positional deviation between the camera 140 and the marker 50A in the Y-axis direction. The center of the 4N antenna elements 111 coincides with the origin of the XYZ coordinate system, and thus coordinates of the center of the 4N antenna elements 111 are expressed as (X, Y, Z)=(0, 0, 0). In addition, there is no positional deviation between the camera 140 and the marker 50A in the Y-axis direction, and the facing distance is given as $r_{FD}$. In this arrangement, the angle of the power receiver 50B that is obtained when viewed from the fisheye lens 141 is expressed as θb. The position of the power receiver 50B can be expressed as (X, Y, Z)=($r_{FD}$ tan θb, 0, $r_{FD}$). Here, when the distance from the fisheye lens 141 to the power receiver 50B is expressed as $r_{ref}$, the distance $r_{ref}$ can be expressed by Equation (6) below.

[Math. 6]
$$r_{ref} = \sqrt{(r_{FD} \cdot \tan\theta b)^2 + 0^2 + r_{FD}^2} \qquad (6)$$

When the position of the i-th antenna element 111 among the N antenna elements 111 is expressed as (X, Y, Z)=($d_i$, 0, 0), a distance $r_i$ from an i-th antenna element 111 to the power receiver 50B can be expressed by Equation (7) below.

[Math. 7]
$$r_i = \sqrt{(r_{FD} \cdot \tan\theta b - d_i)^2 + 0^2 + r_{FD}^2} \qquad (7)$$

With this approach, a path difference $r_i$ between the distance $r_{ref}$ from the fisheye lens 141 to the power receiver 50B, and the distance $r_i$ from the i-th antenna element 111 to the power receiver 50B can be expressed by Equation (8) below.

[Math. 8]
$$\tau_i = r_i - r_{ref} \qquad (8)$$

The path difference $r_i$ is expressed in meters. In this case, when the path difference $r_i$ is converted into a wavelength λ of a microwave to be used, a phase difference $\psi_i$ can be determined by Equation (9).

[Math. 9]
$$\psi_{r_{FD},i}(\theta_b) = 2\pi \cdot \frac{\mathrm{mod}(\tau_i, \lambda)}{\lambda} \qquad (9)$$

$-\psi_{r_{FD}i}(\theta b)$ that is obtained by inverting a sign of the phase difference expressed by Equation (9) is given as a phase that is set for a given phase shifter 120 that is used in a case where the power is transmitted by the i-th antenna 111. It is sufficient when multiple sets of phase data used for multiple elevation angles θa are prepared for the N subarrays 110A to be stored in the memory 156. Further, it is sufficient when the multiple sets of phase data for multiple facing distances $r_{FD}$ are prepared to be stored in the memory 156. With use of the multiple sets of phase data, the transmission power signals transmitted by the N subarrays 110A can reach the power receiver 50B in the same phase. The multiple sets of phase data for multiple angles θb are expressed by Equation (10) below.

[Math. 10]
$$\psi_{r_{FD}}(\theta b) = \{-\psi_{r_{FD},1}(\theta b), \ldots, -\psi_{r_{FD},N}(\theta b)\} \qquad (10)$$

It is sufficient when the control unit 155 sets the shift amounts for the N phase shifters 120 that are coupled to the N subarrays 110A, respectively by using phase data indicating the angle θb that corresponds to the elevation angle θa.

Figure 5:
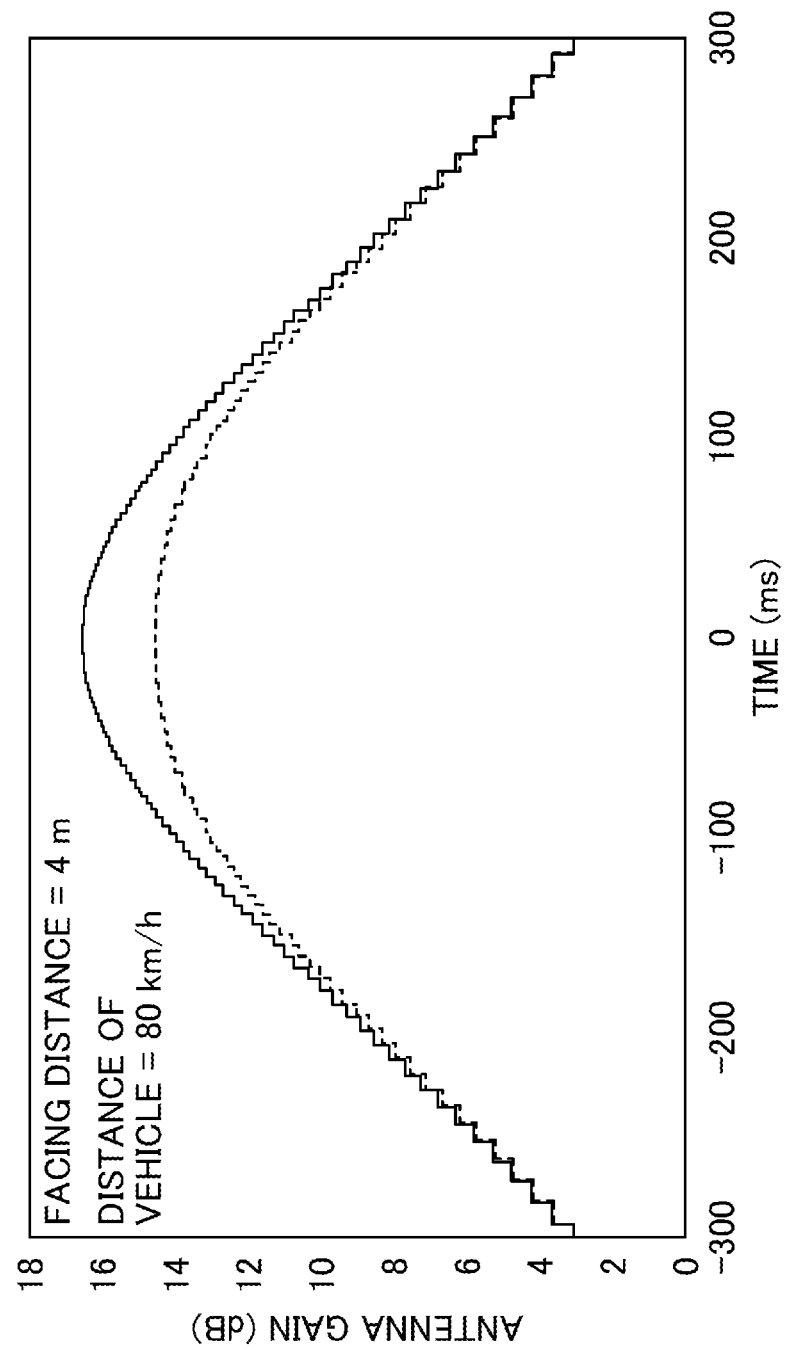
FIG. 5 is a diagram illustrating antenna gains of an antenna device 100A and the feed device 100.

FIG. 5 is a diagram for describing effects of the antenna device 100A and the feed device 100. FIG. 5 illustrates the antenna gain that is obtained in a case where the power is received by the antenna of the power receiver 50B, where the facing distance $r_{FD}$ is 4 m, and the speed of the vehicle on which the antenna device 100A and the feed device 100 are mounted is 80 km/h. The horizontal axis represents the time, where 0 seconds are the time at which the elevation angle θa becomes 0 degrees, −300 sec is a time at which the elevation angle θa becomes +70 degrees, and +300 sec is a time at which the elevation angle θa becomes −70 degrees. That is, the time on the horizontal axis corresponds to the elevation angle θa.

In FIG. 5, a solid line expresses the antenna gain in a case where the shift amounts for the phase shifters 120 are adjusted using phase data that is obtained based on a facing distance and an elevation angle for each of the antenna device 100A and the feed device 100. A broken line expresses the antenna gain in a case where phase data that is obtained based on only an elevation angle is used for comparison. The antenna gain obtained based on only the elevation angle is an antenna gain obtained in the power receiver 50B, in a case where the shift amounts for the N phase shifters 120 that are coupled to the N subarrays 110A are each set to a value that corresponds to the elevation angle θa.

As illustrated in FIG. 5, the antenna gain that is obtained based on a given facing distance and a given elevation angle is larger than or equal to the antenna gain that is obtained based on only the elevation angle. A difference between the antenna gain obtained based on the given facing distance and the given elevation angle, and the antenna gain obtained based on only the elevation angle is increased as a time zone becomes closer to 0 seconds (in accordance with a decreasing absolute value of the elevation angle θa). As the elevation angle θa becomes closer to 0 degrees, a distance between the N subarrays 110A and the power receiver 50B becomes shorter. As a result, it is considered that a remarkable effect of an individual phase control for the N subarrays 110A that is performed based on the facing distance and the elevation angle is obtained.

<Changes in Adjustment Amount of Phase Data in Accordance with Position of Each Antenna Element 111>

Figure 6:
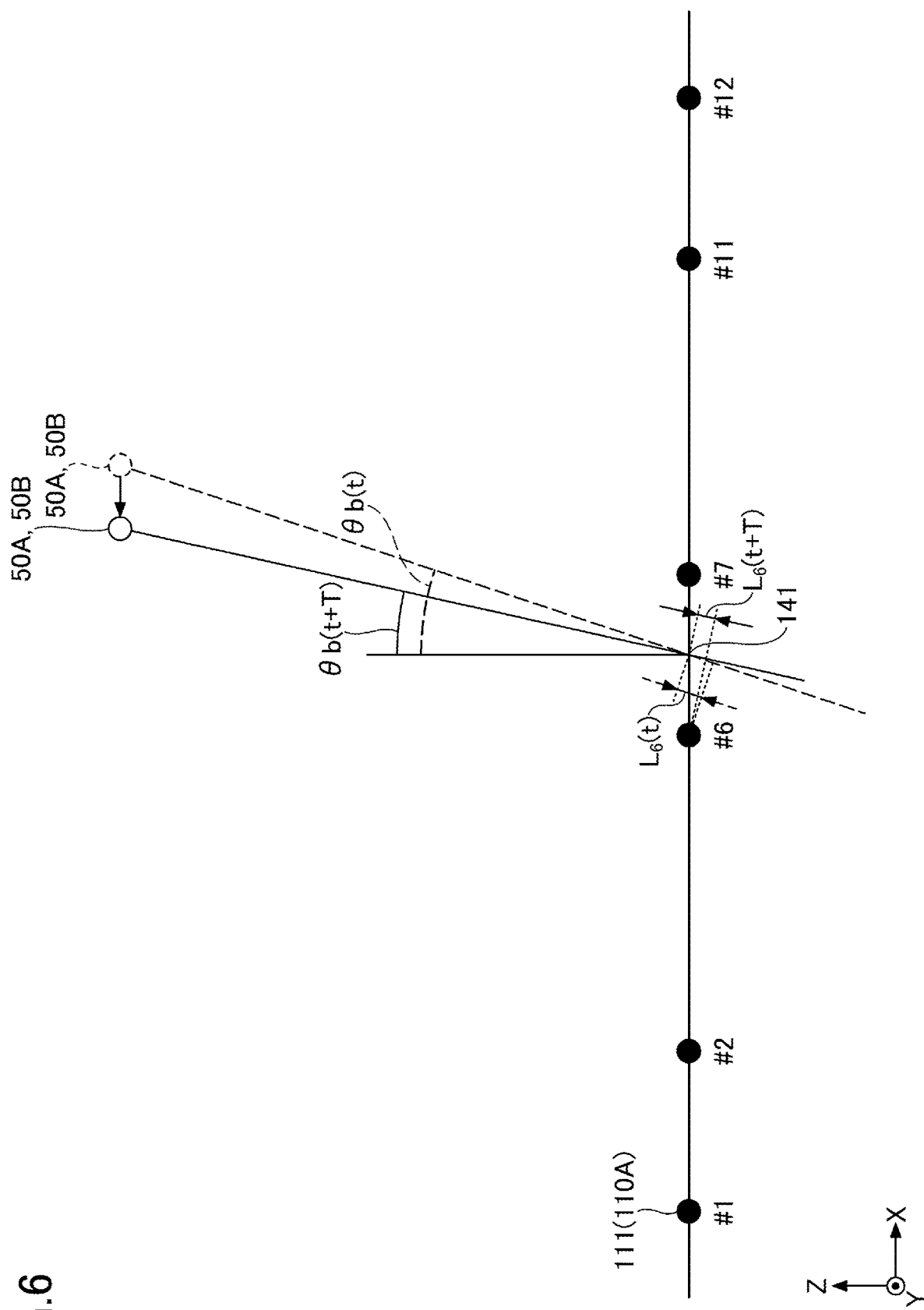
FIG. 6 is a diagram for describing changes in an adjustment amount of the phase data in accordance with a position of each antenna element 111.
Figure 7:
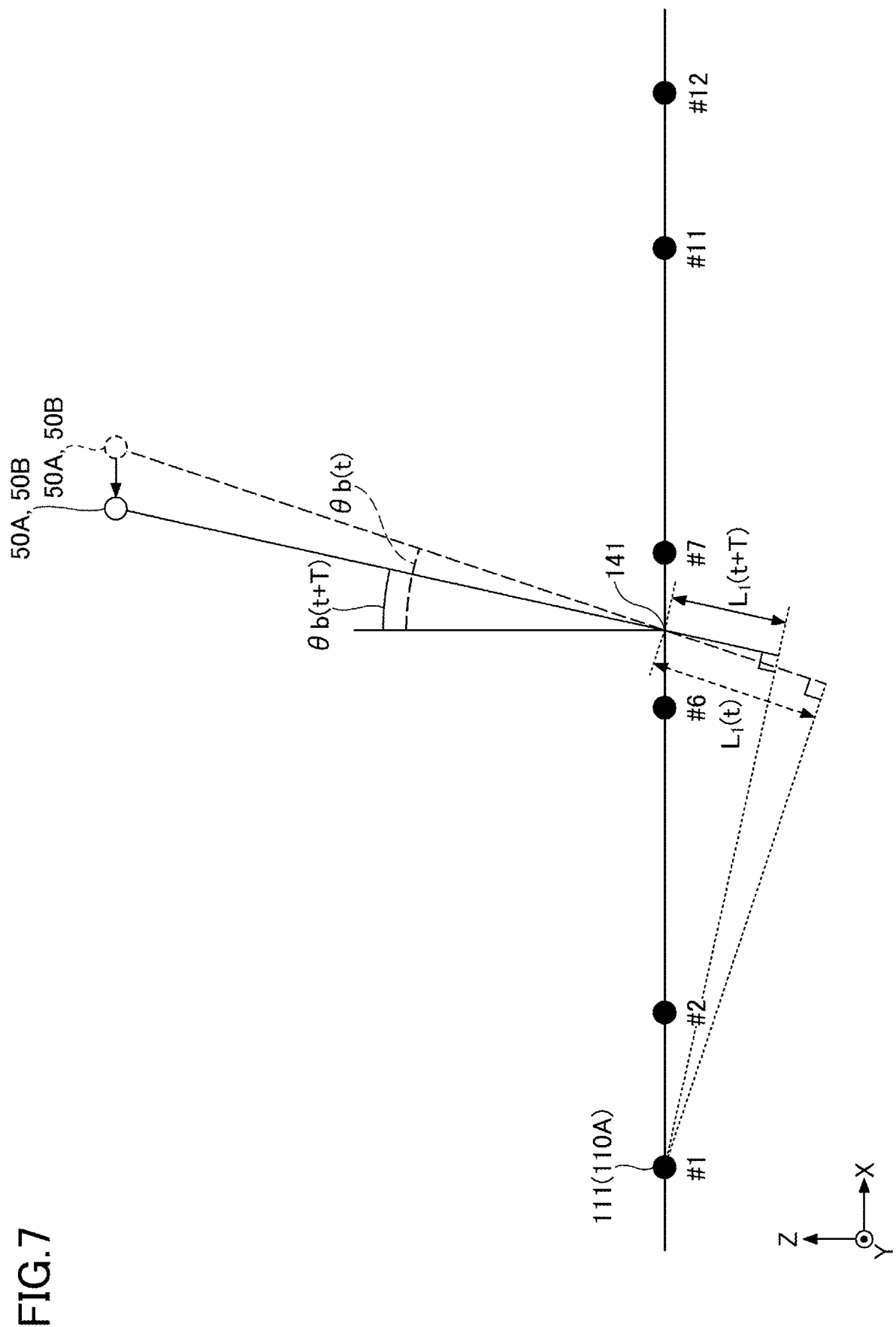
FIG. 7 is a diagram for describing changes in the adjustment amount of the phase data in accordance with the position of each antenna element 111.

FIGS. 6 and 7 are diagrams for describing changes in an adjustment amount of phase data in accordance with the position of each antenna element 111. In an example, a number N of subarrays 110A is 12. In FIGS. 6 and 7, the marker 50A, the power receiver 50B, and twelve subarrays 110A are illustrated. Each antenna element 111 is one of four antenna elements 111 that are included in a corresponding subarray among the twelve subarrays 110A. The position of the marker 50A is the same as the position of the power receiver 50B.

The antenna elements 111 included in the twelve subarrays 110A are expressed as antenna elements 111, #1 to #12, using coordinates #1 to #12 of the subarrays 110A. However, illustration of antenna elements 111, #3 to #5 and #7 to #10, is omitted. In addition, FIGS. 6 and 7 illustrate a difference between a distance to the power receiver 50B from antenna element 111, #6, located at a middle portion of the twelve antenna elements 111 in the X-direction, and a distance to the power receiver 50B from the antenna element 111, #1, located at an end portion of the twelve antenna elements 111 in the X-direction. Here, the difference between distances that are from the respective antenna elements 111, #1 and #6, to the power receiver 50B is indicated by a straight line that connects the fish-eye lens 141 of the camera 140 and the marker 50A. In FIGS. 6 and 7, a figure of the fish-eye lens 141 is omitted, and the position of the fish-eye lens 141 is expressed by a lead line.

FIGS. 6 and 7 illustrate the marker 50A and the power receiver 50B that are situated in a direction indicated by the angle θb (t) at time t, and illustrate the marker 50A and the power receiver 50B in a direction indicated by the angle θb (t+T) at time t+T. The time T expresses a control period T used for the antenna device 100A.

As illustrated in FIG. 6, when a perpendicular line is drawn from the antenna element 111, #6, to the straight line connecting the fish-eye lens 141 and the marker 50A, a distance $L_i$ from an intersection at which the straight line connecting the fish-eye lens 141 and the marker 50A intersects with the perpendicular line, to the fish-eye lens 141 is $L_6$ (t) at time t, and the distance $L_i$ is $L_6$ (t+T) at time t+T.

Likewise, as illustrated in FIG. 7, when a perpendicular line is drawn from the antenna device 111, #1, to a straight line connecting the fish-eye lens 141 and the marker 50A, a distance $L_i$ from an intersection at which the straight line connecting the fish-eye lens 141 and the marker 50A intersects with the perpendicular line, to the fish-eye lens 141 is $L_1$ (t) at time t, and the distance (t) is $L_1$ (t+T) at time t+T.

The distances $L_1$ (t) and $L_1$ (t+T) for the antenna element 111, #1, located at the end in the X-direction are respectively longer than the distances $L_6$ (t) and $L_6$ (t+T) for the antenna element 111, #6, located at the middle portion in the X-direction, and a difference between the distances $L_1$ (t) and $L_1$ (t+T) is larger than a difference between the distances $L_6$ (t) and $L_6$ (t+T).

In this arrangement, for the phase data described with reference to FIG. 4 that illustrates the method for determining the phase data, the phase difference between the phase data at time t and the phase data at time t+T used for the antenna element 111, #1, is larger than the phase difference between the phase data at time t and the phase data at time t+T used for the antenna element 111, #6. Such a phase difference indicates an amount of change in the phase data at time t+T, and is a change amount of shift (adjustment amount) of the phase data.

That is, for phase data for #1 relating to an end side in the X-direction, #2, #11, #12, and the like, the change amount of the shift of the phase data at time t+T is large in comparison to the change amount of the shift of the phase data at time t+T for #5, #6, #7, #8 relating to a middle side.

Figure 8:
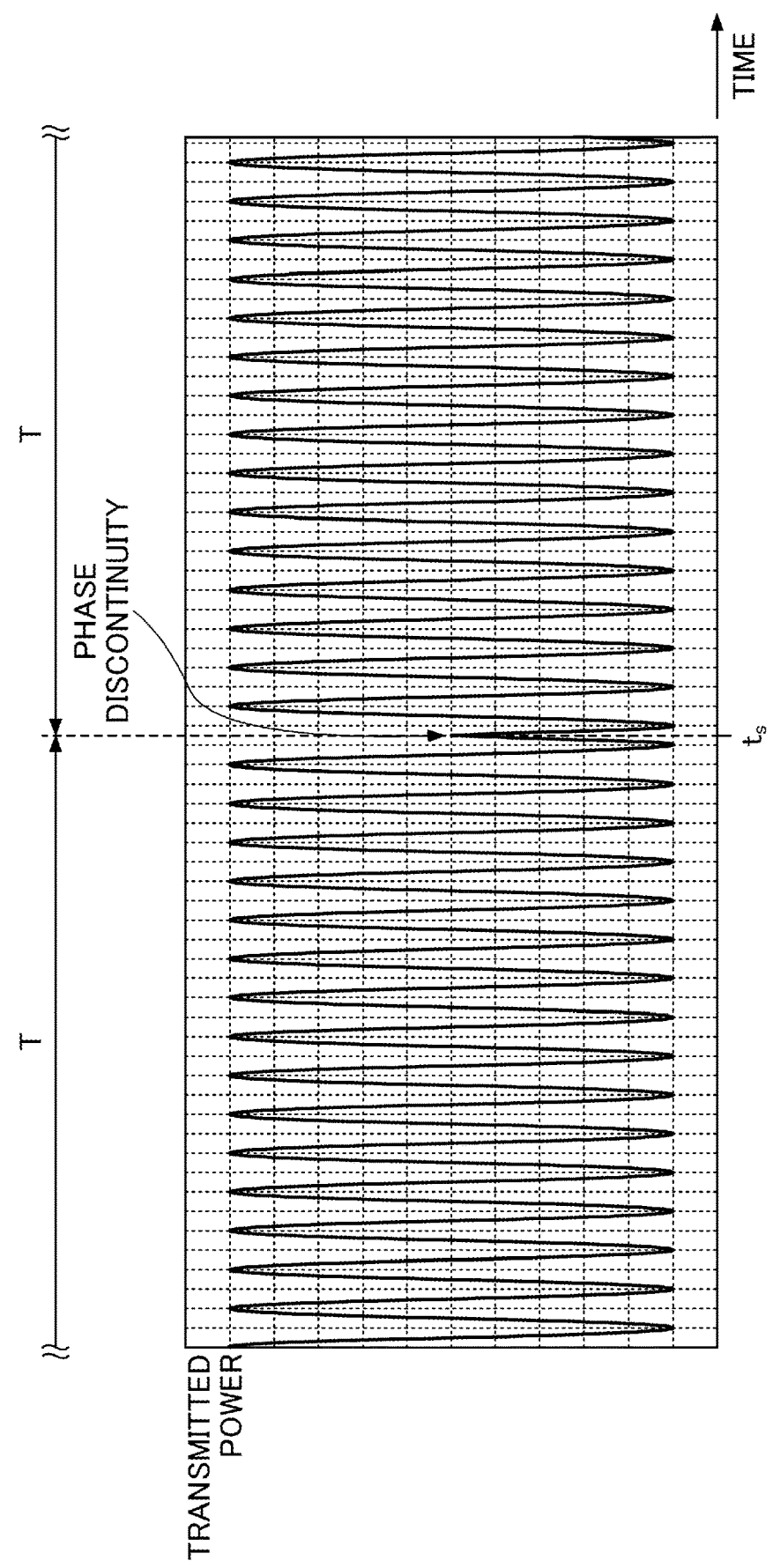
FIG. 8 is a diagram for describing a phase discontinuity.

When a larger change amount of the shift of the phase data at time t+T is obtained, a phase discontinuity is more likely to be created in a case where the phase of a given transmission power signal is changed. FIG. 8 is a diagram for describing the phase discontinuity. In FIG. 8, the horizontal axis expresses the time t, and the vertical axis expresses an amplitude of transmitted power of the transmission power signal.

FIG. 8 shows a waveform of the transmission power signal in a case where phases of the phase data are offset by about 180 degrees at time $t_s$ at which control periods T are switched. The time $t_s$ corresponds to the time t+T in FIGS. 6 and 7, and the time $t_s$ is a time at which two consecutive control periods T are switched. In practice, a shift amount of the phase data does not become 180 degrees at time $t_s$, but the most extreme case will be described in this description.

As described above, when the phase data is significantly adjusted at time $t_s$, a discontinuity in the phase control is created. Such a discontinuity results in the occurrence of harmonics or the like in the transmitted power of the transmission power signal, and thus it is difficult to transmit the power stably. In addition, the discontinuity spreads the spectrum of the transmission power signal, and thus interference with any other device that may be present around the power receiver 50B occurs.

Therefore, in the antenna device 100A according to the embodiments, power ramping is performed on one or more transmission power signals to allow for stable power transmission. The power ramping refers to a gradual decrease or increase in transmitted power in accordance with changes in the transmitted power of one or more transmission power signals. In addition, when phases of one or more transmission power signals are adjusted, in a case where an amount of change in shift of the phase data is large, it may be difficult to ensure a continuity between transmission power signals that are obtained before and after the phase adjustment of a given transmission power signal. For this reason, when the amount of change in the shift of the phase data is greater than or equal to a predetermined threshold, phase shift is performed in a state where the transmitted power of the given transmission power signal is reduced by power ramping. This is because the occurrence of a spurious component such as a harmonic is suppressed to enable the power to be transmitted stably. Also, this is because interference with any other device that may be present around the power receiver 50B occurs.

<Power Transmission Circuit 160>

Figure 9:
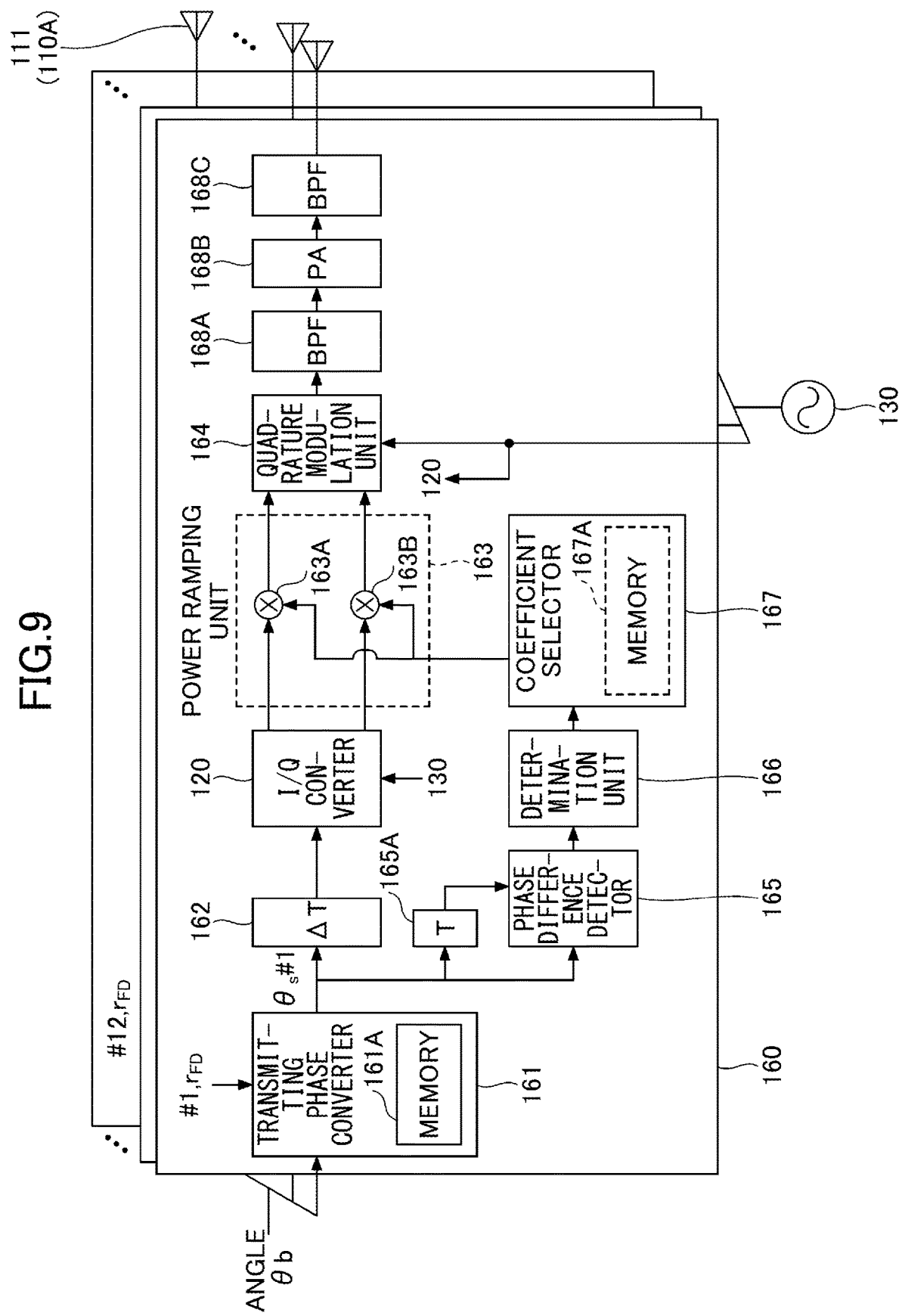
FIG. 9 is a diagram illustrating a configuration of a power transmission circuit 160.

FIG. 9 is a diagram illustrating the configuration of a power transmission circuit 160. One power transmission circuit 160 is provided for each of subarrays 110A. In this figure, in an example, the number N of subarrays 110A is 12. Each power transmission circuit 160 includes one phase shifter 120. The phase shifter 120 also serves as an I/Q converter. In this description, the phase shifter 120 will be described as the phase shifter 120 (I/Q converter).

The power transmission circuit 160 includes a transmitting phase converter 161, a delay unit 162, the phase shifter (I/Q converter) 120, a power ramping unit 163, a quadrature modulation unit 164, a phase difference detector 165, a phase-holding unit 165A, a determination unit 166, a coefficient selector 167, a band-pass filter (BPF) 168A, a power amplifier (PA) 168B, and a BPF 168C. The transmission phase converter 161 is an example of a phase converter.

Among the above components, the transmitting phase converter 161, the delay unit 162, the phase shifter (I/Q converter) 120, the power ramping unit 163, the quadrature modulation unit 164, the phase difference detector 165, the phase-holding unit 165A, the determination unit 166, and the coefficient selector 167 can be implemented by a field programmable gate array (FPGA), for example.

The angle θb that is equal to the elevation angle θa acquired by the elevation-angle acquiring unit 152, the facing distance $r_{FD}$ estimated by the distance estimating unit 154, and coordinates of a given subarray 110A (one of #1 to #12) are input to the transmitting phase converter 161. The transmitting phase converter 161 uses the elevation angle θa as the angle θb indicating a direction in which the marker 50A and the power receiver 50B are present in FIGS. 6 and 7. That is, the transmitting phase converter 161 uses the elevation angle θa as an angle that corresponds to the angle θb. The transmitting phase converter 161 uses the coordinates (one of #1 to #12) of a given antenna element 111, determined by a number of a given subarray 110A, when the transmitting phase converter 161 converts the elevation angle θb to a given phase. The transmitting phase converter 161 identifies coordinates of each of the twelve antenna elements 111 in the X-direction, by using the coordinates of a corresponding subarray 110A.

The transmitting phase converter 161 includes a memory 161A. The memory 161A stores a shift amount (one of θs #1 to θs #12) that corresponds to the coordinates (one of #1 to #12) of a given antenna element 111, for each of the multiple sets of phase data $\psi_3$ (θb) to $\psi_7$ (θb).

As described above, each of the phase data $\psi_3$ (θb) to $\psi_7$ (θb) that is stored in the memory 156 in the controller 150 includes shift amounts θs #1 to θs #N corresponding to the coordinates (#1 to #N) of the antenna elements 111, respectively. The memory 161A of the transmitting phase converter 161 stores the shift amount (one of θs #1 to θs #12) corresponding to the coordinates (one of #1 to #12) of the given antenna element 111, for each of pieces of the phase data $\psi_3$ (θb) to $\psi_7$ (θb).

For example, the memory 161A of the transmitting phase converter 161 in the power transmission circuit 160 for the antenna element 111 that is situated at coordinates #1 stores a shift amount θs #1, corresponding to the coordinates #1 of the antenna element 111, among the pieces of phase data $\psi_3$ (θb) to $\psi_7$ (θb). In the memory 161A of the transmitting phase converter 161 in the power transmission circuit 160 for the antenna element 111 that is situated at coordinates #12, a shift amount θs #12, corresponding to coordinates #12 of the antenna element 111, is stored in association with each of pieces of phase data $\psi_3$ (θb) to $\psi_7$ (θb).

The transmitting phase converter 161 retrieves a given shift amount (one of θs #1 to θs #12) from the memory 161A, based on the angle θb, the facing distance fro, and coordinates (one of #1 to #12) of a given subarray 110A. Then, the transmitting phase converter 161 outputs the given shift amount. For example, when the facing distance $r_{FD}$ is 3 m, the transmitting phase converter 161 of the power transmission circuit 160 for the antenna element 111 that is situated at the coordinates #1 retrieves and outputs a shift amount θs #1 for 3 m that is derived from the angle θb. Then, the transmitting phase converter 161 of the power transmission circuit 160 for the antenna element 111 that is situated at the coordinates #12 retrieves and outputs a shift amount θs #12 for 3 m that is derived from the angle θb.

Hereinafter, a manner in which the transmitting phase converter 161 includes the memory 161A and the memory 161A stores a given shift amount (one of θs #1 to θs #12) will be described. However, the transmitting phase converter 161 may acquire the given shift amount (one of θs #1 to θs #12) from the controller 150, without including the memory 161A. The transmitting phase converter 161 may calculate and obtain the given shift amount (one of θs #1 to θs #12).

The delay unit 162 holds the shift amount θs that is input from the transmitting phase converter 161, for a time period ΔT, and then outputs the shift amount θs. In this arrangement, the delay unit 162 gives a delay of the time period ΔT to the given shift amount θs input from the transmitting phase converter 161, and then outputs the given shift amount θs.

The phase shifter (I/Q converter) 120 shifts the phase of a microwave that is input from the microwave generator 130, based on the shift amount θs input from the delay unit 162. Then, the phase shifter (I/Q converter) 120 generates and outputs an I signal and a Q signal.

The power ramping unit 163 includes multipliers 163A and 163B. The power ramping unit 163 multiplies each of the I signal and the Q signal in the respective multipliers 163A and 163B that are input from the phase shifter (I/Q converter) 120, by a power ramping coefficient that is input from the coefficient selector 167. Then, the power ramping unit 163 transmits the resulting outputs. In the multiplier 163A, the I signal is multiplied by the power ramping coefficient, and in the multiplier 163B, the Q signal is multiplied by the power ramping coefficient. The power ramping coefficient is a coefficient for power ramping, and is a value of 1 or less.

The quadrature modulation unit 164 performs quadrature modulation based on orthogonal outputs of the multipliers 163A and 163B to generate a modulated wave signal. The quadrature modulation unit 164 performs a conversion of a frequency of the modulated wave signal, by using the microwave input from the microwave generator 130, and then the quadrature modulation unit 164 generates and outputs a high frequency signal.

The phase difference detector 165 detects a phase difference between the shift amount θs input from the transmitting phase converter 161 and the shift amount θs input from the phase-holding unit 165A before a given control period T.

The phase-holding unit 165A holds the shift amount θs input from the transmitting phase converter 161, until a subsequent control period starts, and then the phase-holding unit 165A outputs the shift amount θs to the phase-difference detector 165. With this arrangement, the output of the phase-holding unit 165A is the shift amount θs obtained before a time period T. The time period T is a time length that is defined by one cycle of the control period T.

The determination unit 166 determines whether the phase difference input from the phase difference detector 165 is greater than or equal to a predetermined threshold. The determination unit 166 outputs data indicating a determination result to the coefficient selector 167. The predetermined threshold is a value used to determine whether to perform power ramping, and it is sufficient when the threshold is set to an optimal value through an experiment or the like. It is sufficient when the predetermined threshold is approximately set to an angle of 10 degrees to 15 degrees, for example.

The coefficient selector 167 includes a memory 167A. The memory 167A stores power-ramping coefficient data. The power-ramping coefficient data is an example of power ramping data. The coefficient selector 167 retrieves the power-ramping coefficient data from the memory 167A, based on data indicating the determination result that is input from the determination unit 166. Then, the coefficient selector 167 outputs the power-ramping coefficient data to the multipliers 163A and 163B of the power ramping unit 163.

For example, a raised-cosine time response can be used for the power ramping coefficient data. Here, when $\alpha(0<\alpha<1)$ is a roll-off coefficient, the power ramping coefficient data is expressed by Equation (11) below.

[Math. 11]

$$h(t) = \frac{\sin(\pi t/T)}{\pi t/T} \times \frac{\cos(\pi \alpha t/T)}{1-(2\alpha t/T)^2} \quad (11)$$

If the determination result indicates that the power ramping is to be performed, the coefficient selector 167 reads out power ramping coefficient data, and then outputs the power ramping coefficient data to the multipliers 163A and 163B in the power ramping unit 163. If the determination result indicates that power ramping is not to be performed, the coefficient selector 167 fixes the power ramping coefficient at 1, and then outputs the power ramping coefficient to the multipliers 163A and 163B in the power ramping unit 163.

The power ramping coefficient data is data indicating a power ramping coefficient. The power ramping coefficient is a coefficient used to change the transmitted power of the transmission power signal, during both a ramp down period in which a value continuously decreases over a time period ΔT and a ramp up period in which the value continuously increases over the time period ΔT after the ramp down period.

The power ramping coefficient is a coefficient whose value continuously changes over time in the range of greater than or equal to 0 and less than or equal to 1. A case where the value continuously changes means that all power ramping coefficients are put at positions on a continuous curve.

The power ramping coefficient used at the beginning of the ramp down period is 1, and the power ramping coefficient used at the end of the ramp down period is 0. The power ramping coefficient used at the beginning of the ramp up period is 0, and the power ramping coefficient used at the end of the ramp up period is 1.

The reason why the ramp down period is set to the time period ΔT is that, at a timing at which the transmitted power of the transmission power signal becomes 0 after the time period ΔT has lapsed since the start of the power ramping, the phase shifter (I/Q converter) 120 receives the shift amount θs from the delay unit 162, and then shifts the phase of the microwave from the microwave generator 130. This is because, if the phase is shifted at the timing at which the transmitted power becomes 0, a discontinuity is less likely to be created before and after performing the phase shift.

The BPF 168A, the PA 168B, and the BPF 168C are coupled in series in this order on an output-side of the quadrature modulation unit 164. The BPF 168A passes components of the high frequency signal that is input from the quadrature modulation unit 164, and then the BPF 168A outputs the components to the PA 168B. The PA 168B amplifies the high frequency signal output from the BPF 168A, and outputs the amplified signal to the BPF 168C. The BPF 168C passes components of the high frequency signal output from the PA 168B that are in a predetermined frequency range, and then the BPF 168C outputs the high frequency signal to a given antenna element 111 as the transmission power signal.

<Process Example of Power Ramping>

Figure 10:
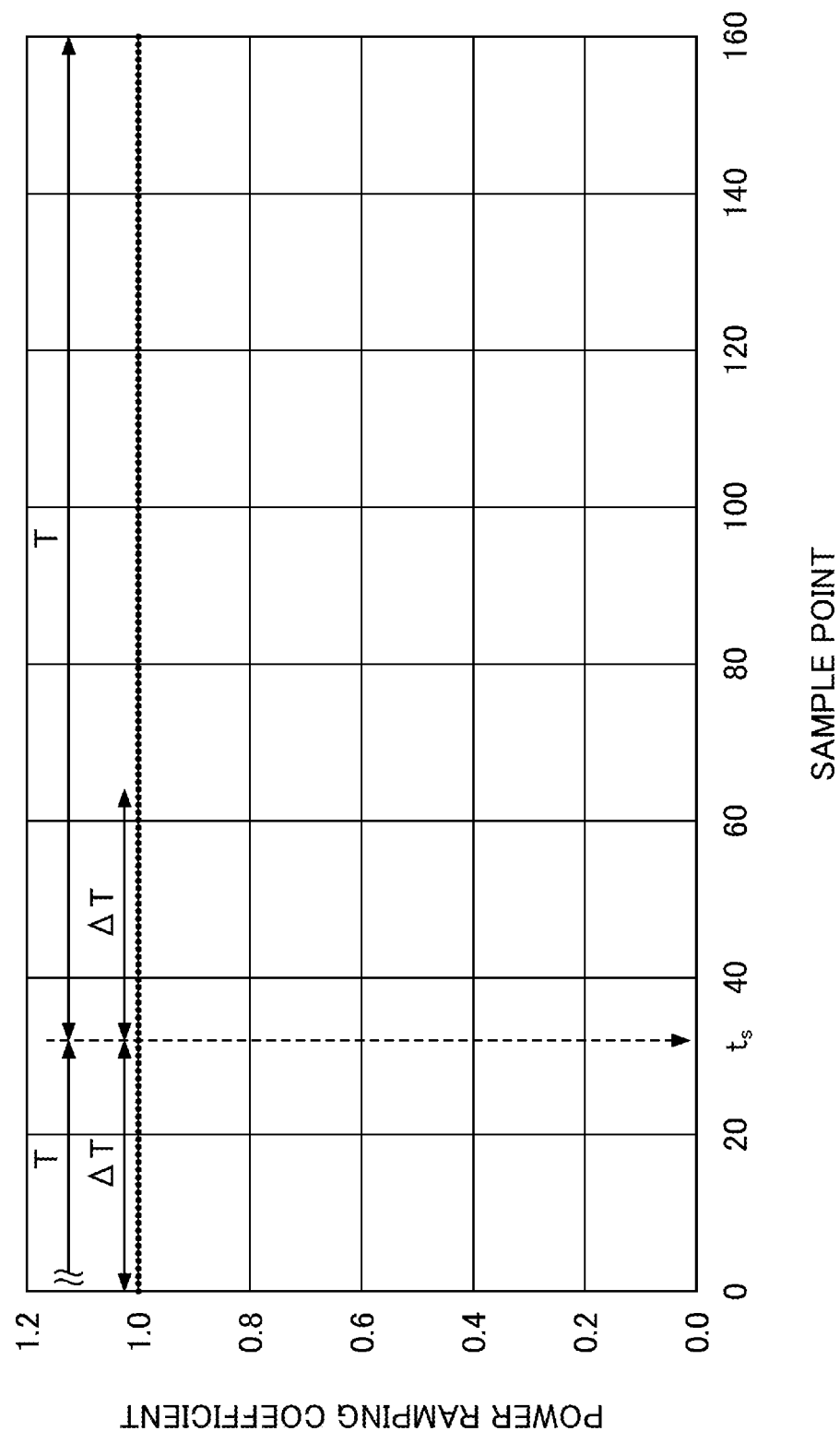
FIG. 10 is a diagram illustrating an example of a temporal change in a power ramping coefficient in a case where power ramping is not performed.

FIG. 10 is a diagram illustrating an example of a temporal change in the power ramping coefficient obtained in a case where power ramping is not performed. In FIG. 10, the horizontal axis is a time axis, and expresses the number of sample points. A time $t_s$ corresponds to the time t+T in FIGS. 6 and 7, and is a time at which two consecutive control periods T are switched.

The power ramping coefficient is fixed at 1 during both a time period ΔT before the time $t_s$ at which control periods T are switched and a subsequent time period ΔT after the time $t_s$. This is because the transmission power signal is directly output without reducing the transmitted power. In this case, the transmitted power of the transmission power signals is constant before and after the time $t_s$. That is, the transmitted power is constant before the beginning of the time period ΔT, which is before the time $t_s$, and after the end of the subsequent time period ΔT, which is after the time $t_s$.

Figure 11:
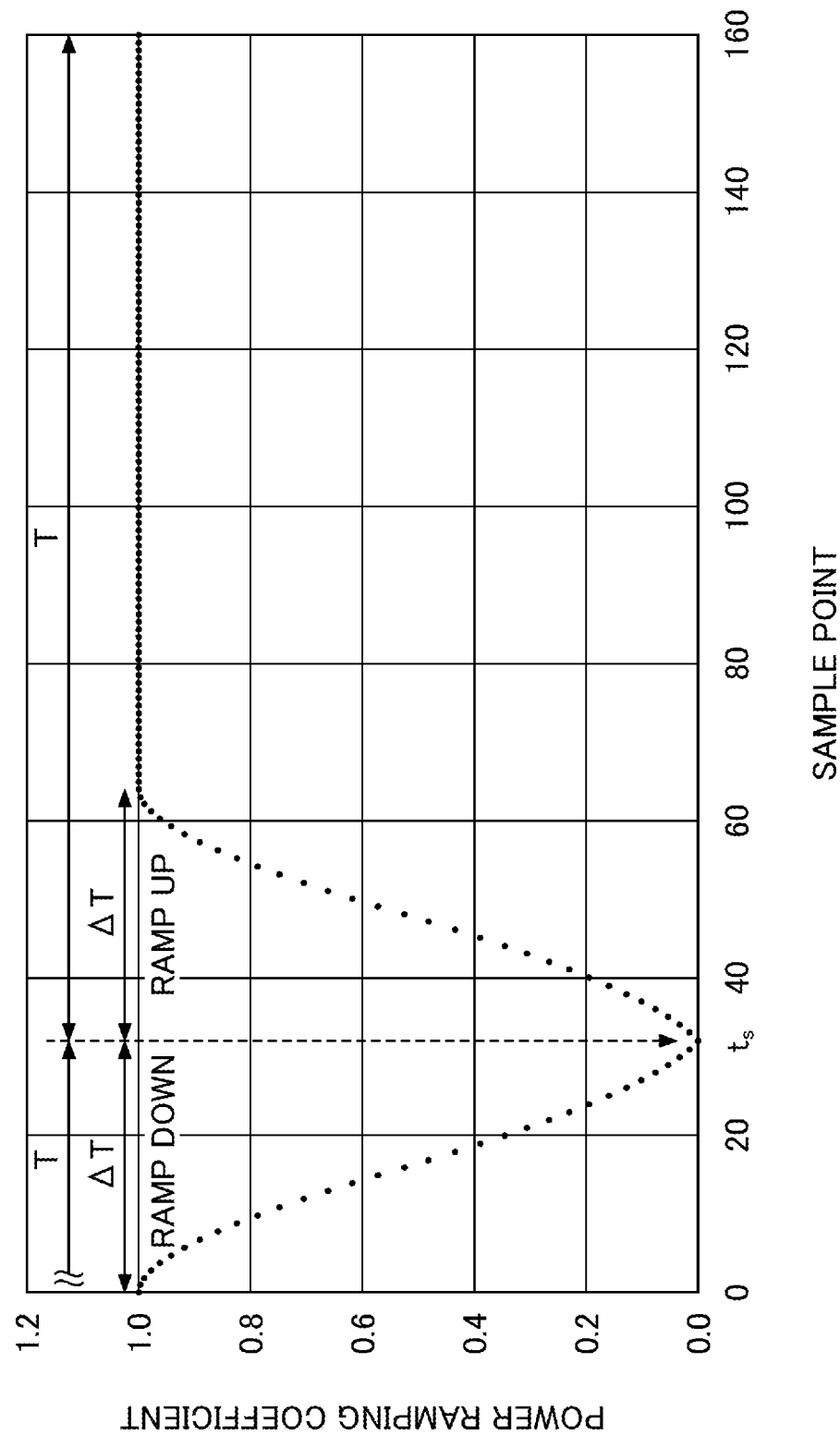
FIG. 11 is a diagram illustrating an example of the temporal change in the power ramping coefficient in a case where power ramping is performed.

FIG. 11 is a diagram illustrating a temporal change example of the power ramping coefficient in a case where power ramping is performed. In FIG. 11, the horizontal axis is a time axis, and expresses the number of sample points, as in the case described in FIG. 10. The time ts corresponds to the time t+T in FIGS. 6 and 7, and the time $t_s$ is a time at which two consecutive control periods T are switched, as in the case in FIG. 10.

The power ramping coefficient is 1 at the beginning of the ramp down period that is the time period ΔT before time $t_s$ at which the control periods T are switched, and the power ramping coefficient continuously decreases over time during the ramp down period. At time $t_s$ that is an end point of the ramp down period, the power ramping coefficient is 0. At time $t_s$, the phase of the microwave corresponding to the transmission power signal is shifted by the shift amount θs in the phase shifter 120 (I/Q converter). At time $t_s$, the power ramping coefficient is 0, and thus the phase of the microwave is shifted in a state where the power of the microwave corresponding to the transmission power signal is 0.

The beginning of the ramp up period that is a subsequent time period ΔT after time $t_s$ is the end of the ramp down period, and is time $t_s$. Thus, the power ramping coefficient is 0. During the ramp up period, the power ramping coefficient continuously increases over time. At time ts+ΔT that is an end point of the ramp up period, the power ramping coefficient is 1. Thereafter, the power ramping coefficient is held at 1 until the time period ΔT before the time $t_s$+T at which the control period changes to a subsequent control period T.

<Transmitted Power of Transmission Power Signal During Power Ramping>

FIG. 12 is a diagram illustrating an example of a temporal change in the transmitted power of the transmission power signal, in a case where power ramping is performed. In FIG. 12, the horizontal axis expresses the time, and the vertical axis expresses the transmitted power. The time ts is a time at which two consecutive control periods T are switched.

In FIG. 12, the power ramping coefficient continuously decreases toward 0 during the ramp down period that is a time period ΔT before time $t_s$, and thus transmitted power of the transmission power signal decreases. An envelope of the transmitted power of the transmission power signal during the ramp down period shows a continuously declining curve, as in the power ramping coefficient during the ramp down period illustrated in FIG. 11. The transmitted power of the transmission power signal becomes 0 at time $t_s$. At this point, the phase of the microwave corresponding to the transmission power signal is shifted by the shift amount θs in the phase shifter 120 (I/Q converter).

During the time period ΔT that is the ramp up period after time $t_s$, the power ramping coefficient continuously increases from 0 toward 1. Thus, the transmitted power of the transmission power signal also increases. During the ramp up period, the envelope of the transmitted power of the transmission power signal shows a curve in which the power ramping coefficient continuously increases, as in the power ramping coefficient for the ramp up period illustrated in FIG. 11.

In the above arrangement, when the elevation angle of the beam 115 from the array antenna 110 is controlled using only the XZ plane, the position P1 that is obtained by equidistant projection is converted into polar coordinates on a plane parallel to the XY plane, to thereby determine the position P2. Subsequently, the X-coordinate (r·cos φ) of a mapped position P2a that is obtained by mapping the position P2 onto the X-axis is divided by the focal distance $f_L$ of the fisheye lens 141, to thereby determine the elevation angle θa (=r·cos φ/$f_L$).

Further, it is sufficient when the control unit 155 uses the angle θb corresponding to the elevation angle θa to set shift amounts for the N phase shifters 120 that are coupled to the N subarrays 110A, respectively. When the shift amounts for the N phase shifters 120 are controlled using phase data that is set in accordance with changes in the elevation angle θa that is set in accordance with the movement of the antenna device 100A and the feed device 100, the power of transmission signals from the N subarrays 110A that are to constantly reach the antenna of the power receiver 50B in the same phase can be transmitted, while the antenna device 100A and the feed device 100 are moving.

Further, when the phase shifter 120 (I/Q converter) shifts the phase of the microwave that corresponds to the transmission power signal, based on the shift amount power θs, ramping is performed to suppress the occurrence of a spurious component such as a high frequency component, before and after the phase shift.

With this arrangement, the antenna device 100A and the feed device 100 that enable power to be transmitted stably can be provided in a case where the phases of the transmission power signals transmitted by the antenna elements 111 are adjusted to match phases for power reception. In addition, interference with any other device that may be present around the power receiver 50B can be suppressed.

The memory 156 stores multiple sets of phase data, for respective facing distances $r_{FD}$, and the distance estimating unit 154 estimates facing distances $r_{FD}$. With this arrangement, shift amounts for the N phase shifters 120 that are coupled to the N subarrays 110A can be set using the multiple sets of phase data in association with the facing distances rep. Thus, by use of the multiple sets of phase data that are in accordance with distances to the power receiver 50B in the Z-axis direction, the antenna device 100A and the feed device 100, which are capable of transmitting the power such that a power receiver can efficiently receive the power even in a case where the power receiver is at a short distance from the antenna device 100A and the feed device 100, can be provided. For example, in a case where multiple sets of phase data in association with facing distances $r_{FD}$ do not exist, it is sufficient when phase data in association with the closest facing distance $r_{FD}$ to an estimated facing distance $r_{FD}$ is used.

When the positional deviation detector 153 detects a positional deviation between the camera 140 and the marker 50A in the Y-axis direction, and the positional deviation occurs, the distance estimating unit 154 retrieves, from the memory 156, data indicating the extent to which the number of pixel indexes changes in accordance with the positional deviation in the Y-axis direction, and then estimates a given facing distance $r_{FD}$ by using the number of pixel indexes that is obtained by making a correction in accordance with the extent to which the positional deviation occurs in the Y-axis direction. With this arrangement, when there is the positional deviation between the camera 140 and the marker 50A in the Y-axis direction, the control unit 155 uses multiple sets of phase data that is in accordance with facing distances $r_{FD}$ that are estimated using the corrected number of pixel indexes. With this approach, even when there is a positional deviation between the camera 140 and the marker 50A in the Y-axis direction, the antenna device 100A and the feed device 100 can be provided to enable the power to be transmitted such that a power receiver can efficiently receive the power based on a given distance to the power receiver 50B in the Z-axis direction, even in a case where the power receiver is at a short distance.

In addition, the antenna device 100A and the feed device 100 control the elevation angle of the beam 115 that is output from the array antenna 110, only in the XZ plane. With this arrangement, the number of phase shifters 120 is one-fourth of that obtained in a case where the elevation angle is controlled using both the XZ plane and the YZ plane. Thus, the antenna device 100A and the feed device 100 can be made at low costs.

The power ramping unit 163 performs power ramping on a given transmission power signal that is supplied to a portion of the multiple antenna elements 111, in a case where the phase shifter (I/Q converter) 120 shifts phases of one or more transmission power signals. The power ramping enables the power to be transmitted stably, while reducing the transmitted power of the transmission power signal. With this arrangement, by performing the power ramping for a portion of the antenna elements 111, both stable power transmission, in which the occurrence of a spurious component such as a harmonic is suppressed, and high efficiency in transmitting the power are enabled. In addition, the interference with any other device that may be present around the power receiver 50B can be suppressed.

In addition, a portion of the antenna elements 111 for which power ramping is performed includes at least one given antenna element 111 for which an amount of change in phase shift of the transmission power signal that is performed by the phase shifter (I/Q converter) 120 is greater than or equal to a predetermined threshold. When the amount of change in the shift is greater than or equal to the predetermined threshold, a phase discontinuity is relatively highly likely to be created before and after the phase shifter (I/Q converter) 120 shifts the phase of the given transmission power signal. In addition, the power ramping causes decreases in the transmitted power of the transmission power signal. With this arrangement, by narrowing down targets on which power ramping is to be performed in light of the amount of change in the phase shift that is performed on the transmission power signal, both stable power transmission in which the occurrence of a spurious component such as a harmonic is suppressed and high efficiency in transmitting the power are enabled. In addition, the interference with any other device that may be present around the power receiver 50B can be suppressed.

Further, the power ramping unit 163 performs power ramping such that transmitted power of the transmission power signal continuously changes. With this arrangement, when the transmitted power is decreased or increased, the occurrence of the spurious component such as a harmonic can be effectively suppressed. Thus, the power can be transmitted more stably. In addition, the interference with any other device that may be present around the power receiver 50B can be suppressed.

The phase shifter (I/Q converter) 120 may shift the phase of the transmission power signal, when the power ramping causes transmitted power of a given transmission power signal to be lower than or equal to a predetermined power threshold. In the above description, the manner in which the phase is shifted when the transmitted power becomes 0 is illustrated. However, the phase of the transmission power signal may be shifted when the transmitted power becomes lower than or equal to a predetermined power threshold. With this arrangement, various patterns for the transmission power signals can be adopted, and thus the power can be transmitted stably. In addition, the interference with any other device that may be present around the power receiver 50B can be suppressed.

When power ramping causes transmitted power of a given transmission power signal to become zero (0) that is preset, the phase shifter (I/Q converter) 120 shifts the phase of the given transmission power signal. With this arrangement, the occurrence of a phase discontinuity can be efficiently suppressed, and thus the power can be transmitted more stably. In addition, the interference with any other device that may be present around the power receiver 50B can be suppressed.

The power ramping unit 163 performs power ramping, using power ramping data indicating a time series of transmitted power of a given transmission power signal that is obtained by adjusting the transmitted power through power ramping. In this arrangement, the transmitted power of the given transmission power signal can be accurately reduced or increased in accordance with power ramping data. Thus, the occurrence of a spurious component such as a harmonic can be effectively suppressed. Therefore, the power can be further transmitted stably. In addition, the interference with any other device that may be present around the power receiver 50B can be suppressed.

Further, the transmitting phase converter 161 to perform a conversion of a given shift amount of phase data, based on coordinates of a given antenna element 111 in the X-axis direction is included. In this arrangement, an appropriate shift amount can be set, taking into account coordinates of the given antenna element 111 in the X-axis direction. With this arrangement, occurrence of a phase discontinuity can be efficiently suppressed, and thus the power can be transmitted more stably. The interference with any other device that may be present around the power receiver 50B can be suppressed. When the delay unit 162 holds the shift amount es during ΔT, the phase adjustment delays at the power receiver 50B during ΔT that is a wait time period. Thus, it is preferable that the length of ΔT, set by the delay unit 162, is set to the extent to which reductions in power reception efficiency do not matter.

The above embodiments are described using a manner in which the center of the fisheye lens 141 coincides with the center of the 4N antenna elements 111. However, the center of the fisheye lens 141 may be deviated from the center of the antenna elements 111. In this case, the coordinate origin used to compute the phase by array antenna control may be shifted by an amount of the deviation. Alternatively, the marker 50A and a given power receiving antenna may be provided so as to be separated from each other by an amount of a positional deviation between the marker 50A and the given power receiving antenna.

In addition, the embodiments are described using a manner in which the controller 150 includes the positional deviation detector 153. However, for example, when it is recognized that there is no positional deviation between the camera 140 and the marker 50A, the distance estimating unit 154 may not make corrections based on a positional deviation, without including the positional deviation detector 153 in the controller 150.

In addition, the embodiments are described using a manner in which the controller 150 includes the distance estimating unit 154. However, for example, in an application in which it is known that the facing distance $r_{FD}$ is constant, it is sufficient when multiple sets of phase data that correspond to one facing distance $r_{FD}$ are stored in the memory 156, without including the distance estimating unit 154 and the positional deviation detector 153 in the controller 150. The transmitting phase converter 161 may output the shift amount according to the angle θ b and the coordinates (one of #1 to #12) of the subarray 110A.

In addition, the embodiments are described using a manner in which the power receiver 50B includes the three power receiving antennas 50B1 to 50B3, and further the marker 50A is provided for each of the power receiving antennas 50B1 to 50B3. The number of power receiving antennas included in the power receiver 50B may be one or two, or may be four or more. It is sufficient when the number of power receiving antennas is determined as appropriate in accordance with the use of the power receiver 50B or restrictions or the like on the output of any other device that may exist around the power receiver 50B.

Although the antenna device, the feed device, and the feed method according to the exemplary embodiments of the present invention are described above, the present invention is not limited to the specifically disclosed embodiments. Various modifications and changes can be made without departing from the scope of the claims.

This international application claims priority to Japanese Patent Application No. 2021-110324 filed Jul. 1, 2021, the entire contents of which are incorporated herein by reference.

DESCRIPTION OF SYMBOLS 50B power receiver
50B1 to 50B3 power receiving antenna
52 radio wave absorber
100 feed device
110 array antenna
110A subarray
111 antenna element
120 phase shifter
130 microwave generator
140 camera
141 fisheye lens
150 controller
151 position deriving unit
152 elevation-angle acquiring unit
153 positional deviation detector
154 distance estimating unit
155 control unit
156 memory
160 power transmission circuit
161 transmitting phase converter
162 delay unit
163 power ramping unit
164 quadrature modulation unit
165 phase difference detector
165A phase-holding unit
166 determination unit
167 coefficient selector
168A BPF
168B PA
168C BPF

The invention claimed is:

1. An antenna device comprising:
an array antenna including multiple antenna elements that are bidimensionally arranged along a first axis and a second axis;
a phase adjuster configured to adjust phases of transmission power signals that are respectively supplied by the multiple antenna elements, with respect to a first axis direction;
an image acquiring device configured to acquire an image through a fisheye lens;
circuitry configured to
convert a first position of a marker that is included in the acquired image, into a second position of polar coordinates on a first plane that includes the first axis and the second axis, the first position being used in the image acquiring device; and
acquire, based on the second position, an elevation angle of a projected position that is obtained by projecting the first position onto a second plane including the first axis and a third axis, the elevation angle being relative to the third axis of the second plane; and a storage that stores multiple sets of phase data for respective elevation angles, the phase data indicating phases in which the transmission power signals are transmitted by the respective antenna elements to a power receiver that is situated at a position of the marker, the phases being adjusted such that the adjusted phases of the transmission power signals that are received by the antenna elements are matched, wherein the circuitry is configured to retrieve, from the storage, the phase data in association with the acquired elevation angle, and control the phase adjuster such that a direction of a beam, emitted by the array antenna based on the retrieved phase data, defines the elevation angle for the second plane; and perform power ramping on at least one given transmission power signal among the transmission power signals, in a case where the phase adjuster adjusts the phases of the transmission power signals.

2. The antenna device according to claim 1, wherein the circuitry is configured to perform the power ramping on the at least one given transmission power signal that is supplied to a portion of the multiple antenna elements, in the case where the phase adjuster adjusts the phases of the transmission power signals.

3. The antenna device according to claim 2, wherein the portion of the multiple antenna elements includes at least one given antenna element for which an amount of change in phase adjustment of the given transmission power signal that is performed by the phase adjuster is greater than or equal to a predetermined threshold.

4. The antenna device according to claim 1, wherein the circuitry is configured to perform the power ramping such that transmitted power of the given transmission power signal changes continuously.

5. The antenna device according to claim 1, wherein the phase adjuster is configured to adjust at least one given phase of the given transmission power signal, upon occurrence of a condition in which power ramping causes transmitted power of the given transmission power signal to be lower than or equal to a predetermined power threshold.

6. The antenna device according to claim 5, wherein the predetermined power threshold is zero.

7. The antenna device according to claim 1, wherein the circuitry is configured to perform the power ramping, using power ramping data indicating a time series of transmitted power of the given transmission power signal that is obtained by making an adjustment with power ramping.

8. The antenna device according to claim 7, wherein the power ramping data includes a raised-cosine time response.

9. The antenna device according to claim 1, wherein the circuitry is configured to estimate a distance from the image acquiring device to the marker, based on the acquired image, in a case where the acquired elevation angle is 0 degrees, wherein the storage stores the multiple sets of phase data for respective multiple distances each of which is from the image acquiring device to the marker, and wherein the circuitry is configured to retrieve, from the storage, the phase data based on the estimated distance and the acquired elevation angle, and control the phase adjuster based on the retrieved phase data.

10. The antenna device according to claim 9, wherein the circuitry is configured to detect a positional deviation between the image acquiring device and the marker in a second axis direction, based on a position of a center of gravity of the marker included in the acquired image, and estimate the distance from the image acquiring device to the marker, based on the image that is obtained by making a correction in accordance with a degree of the detected positional deviation.

11. The antenna device according to claim 1, wherein the circuitry is configured to determine, as the elevation angle, a value that is obtained by dividing coordinates of a mapped position, which is obtained by mapping the second position onto the first axis, by a focal length of the fisheye lens.

12. The antenna device according to claim 11, wherein the coordinates of the mapped position are indicated by a value that is obtained by multiplying a radius vector used for the polar coordinates by a cosine of an argument.

13. The antenna device according to claim 1, wherein the multiple antenna elements are grouped into multiple subarrays each of which extends along a second axis direction, and wherein the phase adjuster includes multiple phase shifters coupled to the respective subarrays and configured to adjust phases of given transmission power signals, for each of the subarrays.

14. A feed device comprising:

an array antenna including multiple antenna elements that are bidimensionally arranged along a first axis and a second axis;

a radio wave generator;

a phase adjuster provided between the array antenna and the radio wave generator, and configured to adjust phases of transmission power signals that are respectively supplied from the radio wave generator to the multiple antenna elements, with respect to a first axis direction;

an image acquiring device configured to acquire an image through a fisheye lens;

circuitry configured to convert a first position of a marker that is included in the acquired image, into a second position of polar coordinates on a first plane that includes the first axis and the second axis, the first position being used in the image acquiring unit; and acquire, based on the second position, an elevation angle of a projected position that is obtained by projecting the first position onto a second plane including the first axis and a third axis, the elevation angle being relative to the third axis of the second plane; and a storage that stores multiple sets of phase data for respective elevation angles, the phase data indicating phases in which the transmission power signals are transmitted by the respective antenna elements to a power receiver that is situated at a position of the marker, the phases being adjusted such that the adjusted phases of the transmission power signals that are received by the antenna elements are matched, wherein the circuitry is configured to retrieve, from the storage, the phase data in association with the acquired elevation angle, and control the phase adjuster such that a direction of a beam, emitted by the array antenna based on the retrieved phase data, defines the elevation angle for the second plane; and perform power ramping on at least one given transmission among the transmission power signals, in a case where the phase adjuster adjusts the phases of the transmission power signals.

15. A feed method by a feed device that includes:

an array antenna including multiple antenna elements that are bidimensionally arranged along a first axis and a second axis;

a radio wave generator;

a phase adjuster provided between the array antenna and the radio wave generator, and configured to adjust phases of transmission power signals that are respectively supplied from the radio wave generator to the multiple antenna elements, with respect to a first axis direction;

an image acquiring device configured to acquire an image through a fisheye lens;

circuitry configured to convert a first position of a marker that is included in the image acquired by the image acquiring unit, into a second position of polar coordinates on a first plane that includes the first axis and the second axis, the first position being used in the image acquiring device;

acquire, based on the second position, an elevation angle of a projected position that is obtained by projecting the first position onto a second plane including the first axis and a third axis, the elevation angle being relative to the third axis of the second plane; and a storage that stores multiple sets of phase data for respective elevation angles, the phase data indicating phases in which the transmission power signals are transmitted by the respective antenna elements to a power receiver that is situated at a position of the marker, the phases being adjusted such that the adjusted phases of the transmission power signals that are received by the antenna elements are matched, wherein the circuitry is configured to retrieve, from the storage, the phase data in association with the acquired elevation angle, and control the phase adjuster such that a direction of a beam, emitted by the array antenna based on the retrieved phase data, defines the elevation angle for the second plane, wherein the phase data is phase data relating to the elevation angles that are within a predetermined included angle range, the feed method comprising:

retrieving, from the storage, the phase data in association with the acquired elevation angle;

controlling the phase adjuster such that the direction of the beam, emitted by the array antenna based on the retrieved phase data, defines the elevation angle for the second plane; and performing power ramping on at least one given transmission power signal among the transmission power signals, in a case where the phase adjuster adjusts the phases of the transmission power signals.

* * * * *